United States Patent
Alicherry et al.

(10) Patent No.: US 8,891,520 B2
(45) Date of Patent: Nov. 18, 2014

(54) SCALING REDUNDANCY ELIMINATION MIDDLEBOXES

(75) Inventors: Mansoor A. Alicherry, Karnataka (IN); Ashok Anand, Karnataka (IN); Shoban Preeth Chandrabose, Karnataka (IN)

(73) Assignee: Alcatel Lucent, Boulogne-Billancourt (FR)

(*) Notice: Subject to any disclaimer, the term of this patent is extended or adjusted under 35 U.S.C. 154(b) by 69 days.

(21) Appl. No.: 13/535,973

(22) Filed: Jun. 28, 2012

(65) Prior Publication Data

US 2014/0003421 A1 Jan. 2, 2014

(51) Int. Cl.
*H04L 12/56* (2006.01)

(52) U.S. Cl.
USPC .......................................................... 370/389

(58) Field of Classification Search
CPC ..................................................... H04L 12/56
USPC ........... 370/356, 389, 254–350; 709/201–213
See application file for complete search history.

(56) References Cited

U.S. PATENT DOCUMENTS

| | | | |
|---|---|---|---|
| 2005/0083934 A1* | 4/2005 | Tan et al. | 370/392 |
| 2011/0176556 A1* | 7/2011 | Guo et al. | 370/474 |
| 2013/0279524 A1* | 10/2013 | Guo et al. | 370/474 |

OTHER PUBLICATIONS

U.S. Appl. No. 13/466,251, filed May 8, 2012.
A. Anand et al., "Packet Caches on Routers: The Implications of Universal Redundant Traffic Elimination," SIGCOMM '08, Aug. 17-22, 2008, Seattle, Washington, USA.
B. Aggarwal et al., "EndRE: An End-System Redundancy Elimination Service for Enterprises," NSDI 2010.

* cited by examiner

*Primary Examiner* — Ayaz Sheikh
*Assistant Examiner* — Debebe Asefa
(74) *Attorney, Agent, or Firm* — Wall & Tong LLP

(57) ABSTRACT

A capability is provided for scaling Redundancy Elimination (RE) middleboxes. The RE middleboxes include an RE encoding middlebox and an RE decoding middlebox. The RE middleboxes may employ max-match-based RE techniques or chunk-match-based RE techniques. The RE middleboxes may utilize Distributed Hash Tables (DHTs) to maintain content stores, respectively. The RE middleboxes may be scaled for use with cloud applications (e.g., for use in transfer of data between a customer network and a cloud side, for use in transfer of data between two cloud sites, or the like).

21 Claims, 10 Drawing Sheets

SCALING REDUNDANCY ELIMINATION MIDDLEBOXES

TECHNICAL FIELD

The invention relates generally to communication networks and, more specifically but not exclusively, to providing redundancy elimination in communication networks.

BACKGROUND

Many enterprises are moving toward adoption of cloud-based services. For many enterprises, middleboxes are one of the important components of the enterprise network. Accordingly, several cloud providers and third party services providers are offering middleboxes as a service (or as a virtual appliance) within the cloud. One type of middlebox that is commonly used is the Wide Area Network (WAN) optimizer middlebox (which also may be referred to as a Redundancy Elimination (RE) middlebox, given that WAN optimization typically includes RE functions). In general, WAN optimizer middleboxes suppress duplicate content within traffic, and also may provide bandwidth savings as well as improve application performance. A WAN optimizer middlebox of an enterprise can be deployed between the enterprise and the cloud, or between two cloud sites used by the enterprise in a distributed setting. In many cases, it is desirable to have pay-per-use capabilities for such WAN optimizer middleboxes, similar to applications like web servers, where the providers or users of the WAN optimizer middleboxes incur costs as per traffic demand. As the adoption of cloud-based services by enterprises continues to grow, it is becoming desirable to be able to scale WAN optimizer middleboxes to handle greater volumes of traffic.

SUMMARY

Various deficiencies in the prior art are addressed by embodiments for scaling redundancy elimination middleboxes.

In one embodiment, an apparatus includes a data processing module having a processor and a memory communicatively connected to the processor, wherein the data processing module is configured to determine, based on a packet class of a received packet, which of a plurality of redundancy elimination (RE) processing functions to perform for the received packet.

In one embodiment, a method includes determining, at a data processing module comprising a processor and a memory, which of a plurality of redundancy elimination (RE) processing functions to perform for a received packet, where the determining is based on a packet class of a received packet.

In one embodiment, an apparatus includes a data processing module having a processor and a memory communicatively connected to the processor, wherein the data processing module is configured to perform redundancy elimination (RE) processing functions for a received packet based on a portion of a distributed hash table (DHT) associated with the data processing module.

In one embodiment, an apparatus includes a data processing module having a processor and a memory communicatively connected to the processor, wherein the data processing module is configured to cooperate with at least one other data processing module to perform redundancy elimination (RE) processing for a packet.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

In general, a redundancy elimination (RE) capability is provided for scaling RE middleboxes in communication networks.

In at least some embodiments, the RE capability enables RE using the content history of some or all of the RE middlebox instances while still scaling the processing for RE. As a result, at least some embodiments of the RE capability effectively scale both storage and processing capabilities for RE middleboxes.

It is noted that, although primarily depicted and described herein within the context of providing the RE capability within a cloud-based communication system (e.g., for communication between cloud sites via a wide area network (WAN)), various embodiments of the RE capability may be utilized within other types of communication systems in which redundancy elimination may be necessary or desirable.

Figure 1:
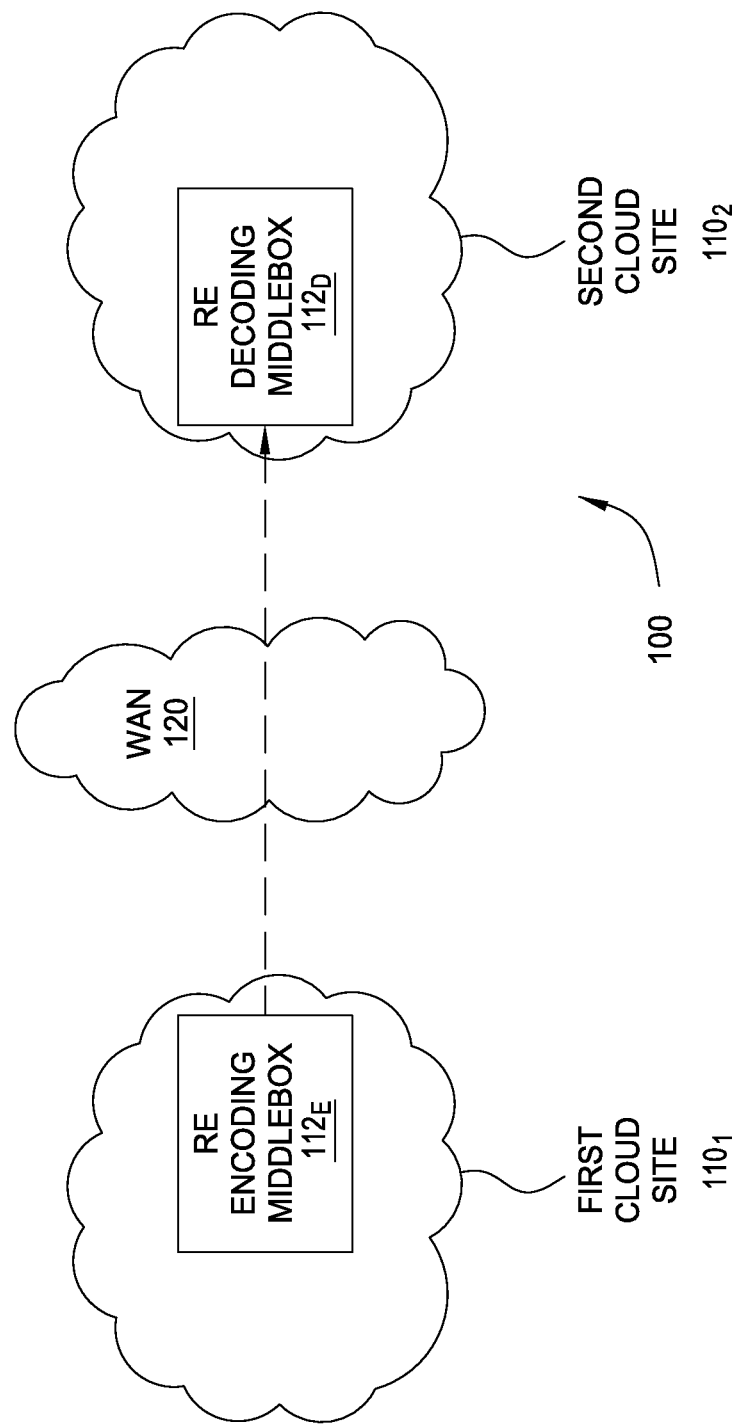
FIG. 1 depicts a high-level block diagram of an exemplary cloud-based communication system supporting redundancy elimination (RE) functions.

FIG. 1 depicts a high-level block diagram of an exemplary cloud-based communication system supporting redundancy elimination (RE) functions.

As depicted in FIG. 1, cloud-based communication system 100 includes a first cloud site $110_1$ and a second cloud site $110_2$ (collectively, cloud sites 110) capable of communication via a wide area network (WAN) 120. The cloud sites 110 are configured to support WAN optimization for optimizing various aspects of the transfer of data between cloud sites 110 via WAN 120. As part of WAN optimization, cloud sites 110 are configured to support RE functions for eliminating redundancy in transfer of data from the first cloud site $110_1$ to the second cloud site $110_2$ via WAN 120 (although it will be appreciated that cloud sites 110 alternatively or also may be configured to support WAN optimization for optimizing various aspects of the transfer of data from the second cloud site $110_2$ to the first cloud site $110_1$ via WAN 120). More specifically, first cloud site $110_1$ includes an RE encoding middlebox $112_E$ and second cloud site includes an RE decoding middlebox $112_D$. The WAN 120 may be any type of communication network suitable for supporting propagation of data between cloud sites 110.

In general, WAN optimization functions typically include redundancy elimination (RE) functions as well as other types of functions. While different WAN optimization solutions may differ in the manner in which the RE functionality is implemented, the basic RE methodology is similar in most cases. In general, RE is provided using a pair of RE middleboxes including an encoding middlebox and a decoding middlebox configured to encode and decode data items in a manner for reducing or eliminating transfer of redundant data, respectively. It is noted that the data items may include packets, portions of packets (which also may be referred to herein as chunks), or the like, as well as various combinations thereof.

In general, an encoding middlebox receives original packets, encodes the original packets into encoded (smaller) packets, and propagates the encoded packets via a network. An encoding middlebox typically maintains two structures: a fingerprint table and a content store. The fingerprint table includes fingerprints pointing to content in the content store (e.g., packets, portions of packets, or the like). The content store stores content received at the encoding middlebox (e.g., new content is stored upon arrival and older content is evicted to make room for newer content). The fingerprint table is adjusted accordingly when content it added to and evicted from the content store. The encoding middlebox may be configured to support max-match RE, chunk-match RE, or any other suitable RE scheme.

In max-match RE, generally speaking, a maximal matched region of the original packet is replaced by an encoded region that is smaller than the matched region, thereby making the original packet smaller. The fingerprints are computed per packet based on a fingerprint algorithm (e.g., using Rabin fingerprinting or any other suitable type of fingerprint algorithm). A fingerprint is selected from the original packet. The selection of the fingerprint may be based on certain criteria (e.g., value sampling or the like). A lookup is performed in the fingerprint table, using the selected fingerprint, in order to determine if the selected fingerprint from the original packet is included in the fingerprint table. If a match is found in the fingerprint table, the corresponding stored packet in the content store is retrieved and the matched region between the original packet and stored packet is expanded via comparison (e.g. byte-by-byte comparison) until the maximal match between the original packet and the stored packet is identified. After the maximal match is identified, the matched region of the original packet is replaced by an encoded region (e.g., a shim header including a pointer to the one of the stored packets from the content store and a size of the matched region).

In chunk-match RE, generally speaking, a chunk of the original packet is replaced by an encoded region that is smaller than the chunk, thereby making the original packet smaller. The original packet is divided into chunks and the chunks are stored in the content store. The fingerprint table includes hashes pointing to the chunks in the content store. A fingerprint is selected from the original packet. The selection of the fingerprint may be based on certain criteria (e.g., value sampling or the like). A lookup is performed in the fingerprint table, using the selected fingerprint, in order to determine if the selected fingerprint from the original packet is included in the fingerprint table. If a match is found in the fingerprint table, the matched region/chunk of the original packet is replaced by an encoded region (e.g., a shim header including a pointer to the one of the stored chunks from the content store and a size of the matched region/chunk). In chunk-match RE, a comparison-based expansion is not performed when a match is found in the fingerprint table.

In general, a decoding middlebox receives encoded packets and reconstructs the original packets from the encoded packets. The decoding middlebox has a content store similar to the content store maintained on the encoding middlebox (e.g., storing packets in max-match RE, storing chunks in chunk-match RE, and so forth). When an encoded packet including an encoded region (which also may be referred to herein as an encoding key) is received at the decoding middlebox, the encoded region is used to reconstruct the original packet by replacing the encoded region with the original content (i.e., the content that was removed from the original packet and replaced with the encoded region by the encoding middlebox). The encoded region is used to perform a lookup in the content store of the decoding middlebox to retrieve the original content and the encoded region is then replaced by the original content such that the original packet is reformed.

In the RE middleboxes, the various data structures may be maintained in memory or disk. In at least some cases, for high performance, the data structures are maintained in memory only. The term "storage module" may be used herein to refer to any type of storage suitable for use in maintaining such data structures for RE middleboxes (e.g., memory, disk, or the like, as well as various combinations thereof).

As described herein, such RE middleboxes may be implemented as virtual appliances in a cloud setting; however, scaling of such RE middleboxes implemented as virtual appliances is non-trivial and, further, load-balancing based approaches to scaling of such RE middleboxes implemented as virtual appliances typically do not work well. As noted hereinabove, at least some embodiments of the RE capability provide effective scaling of storage and processing capabilities for RE middleboxes.

In one embodiment, the RE encoding middlebox $112_E$ and the RE decoding middlebox $112_D$ are configured to support scaling of storage and processing capabilities related to providing RE functions for transfer of data via the WAN 120. Exemplary embodiments of RE encoding middlebox $112_E$ and RE decoding middlebox $112_D$ for max-match RE are depicted and described with respect to FIG. 2 and FIG. 3, respectively. Exemplary embodiments of RE encoding middlebox $112_E$ and RE decoding middlebox $112_D$ for chunk-match RE are depicted and described with respect to FIG. 5 and FIG. 6, respectively.

It is noted that, although primarily depicted and described in FIG. 1 with respect to an embodiment in which RE processing middleboxes are utilized in order to optimize communication between two cloud sites, RE processing middleboxes also may be utilized in order to optimize communication between various other elements (e.g., between an enterprise and a cloud site, between a user and a cloud site, between a radio access network (RAN) and a core network (CN) in a wireless communication system, or the like, as well as various combinations thereof).

In one embodiment, RE encoding middlebox $112_E$ and RE decoding middlebox $112_D$ are configured to support max-match RE capabilities. This is depicted and described with respect to FIGS. 2, 3, and 4.

Figure 2:
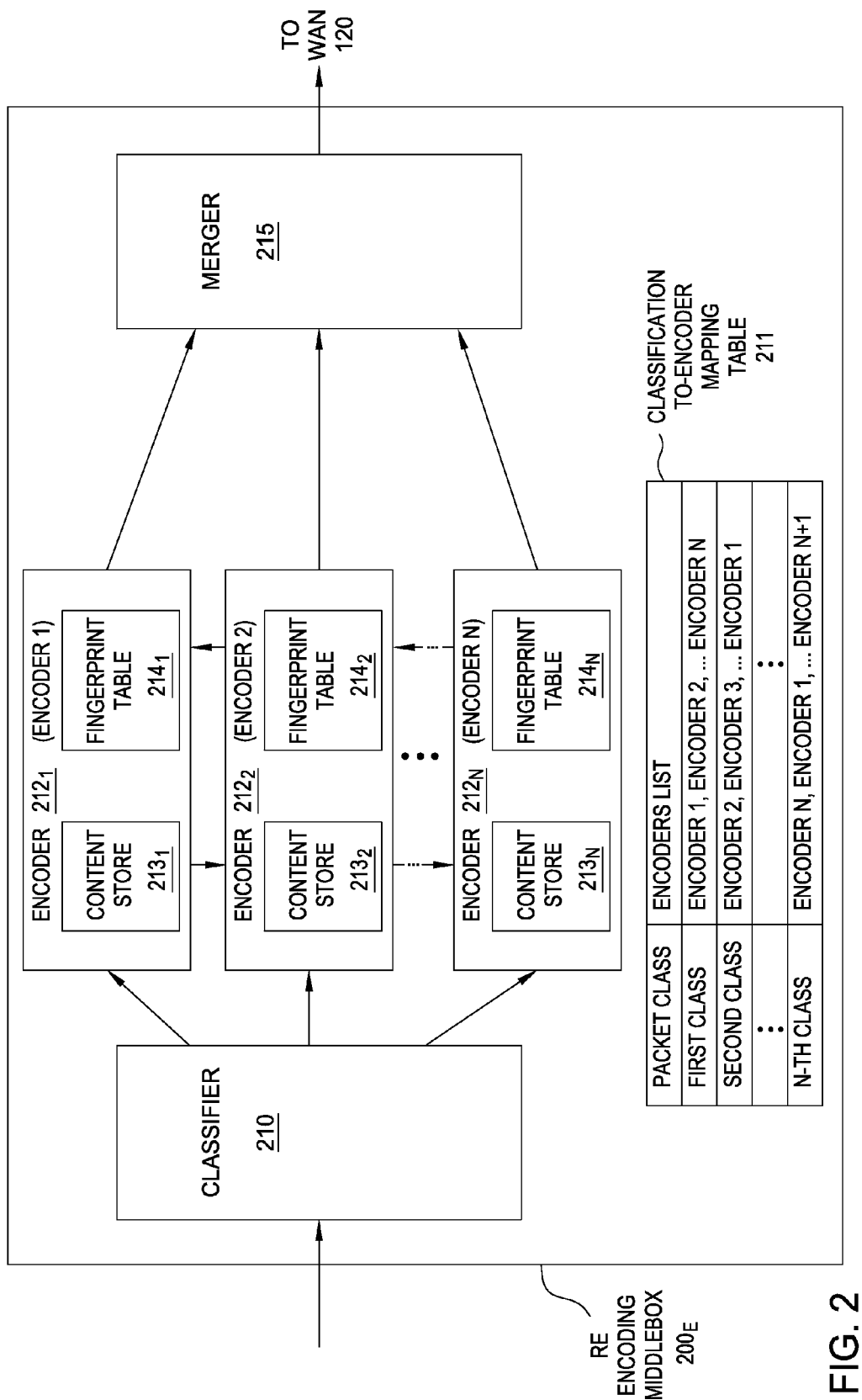
FIG. 2 depicts an exemplary embodiment of an RE encoding middlebox for max-match RE.

FIG. 2 depicts an exemplary embodiment of an RE encoding middlebox for max-match RE. More specifically, FIG. 2 depicts an exemplary embodiment of RE encoding middlebox $112_E$ for max-match RE (denoted as RE encoding middlebox $200_E$).

The RE encoding middlebox $200_E$ includes a classifier 210, a classification-to-encoders mapping table 211, a plurality of encoders $212_1$-$212_N$ (collectively, encoders 212), and a merger 215. The encoders $212_1$-$212_N$ include a plurality of content stores $213_1$-$213_N$ (collectively, content stores 213) and a plurality of fingerprint tables $214_1$-$214_N$ (collectively, fingerprint tables 214), respectively.

The classifier 210 is configured to communicate with each of the encoders 212. The merger 215 also is configured to communicate with each of the encoders 212. The encoders 212 are configured to communicate with each other and it is noted that, although primarily depicted as communicating with each other serially (illustratively, encoder $212_1$ communicating with encoder $212_2$, and so forth, as well as in the opposite order), in at least some embodiments any encoder 212 may communicate with any other encoder 212 directly (i.e., without traversing other encoders 212) or indirectly without traversing the depicted order of encoders 212.

The RE encoding middlebox $200_E$ is configured such that packets are classified by classifier 210 and then processed by encoders 212 in a different manner (e.g., processed by different subsets of encoders 212, processed by encoders 212 using different orders of encoders 212, or the like, as well as various combinations thereof) based on the packet classes of the packets as determined by classifier 210.

The classifier 210 receives packets and determines classifications of the received packets. The RE encoding middlebox $200_E$ may support any suitable numbers and types of packet classes which may be based on any suitable criteria. For example, classification of received packets by classifier 210 may be performed in a round-robin manner, using load-balancing based on packet sizes of the packets, or the like. In one embodiment, the set of packet classes supported by the RE encoding middlebox $200_E$ is the same as the set of packet classes supported by the RE decoding middlebox $112_D$. The classifier 210 provides classified packets to the encoders 212 in accordance with the classification-to-encoders mapping table 211.

The classification-to-encoders mapping table 211 specifies, for each of the packet classes, a mapping of the packet class to the respective manner in which encoders 212 are to be used to encode packets of that packet class.

For a given packet class, the manner in which encoders 212 are to be used to encode packets of the packet class is specified as an encoders list, where the order of the encoders 212 in the encoders list specifies the order in which the encoders 212 are to operate on each packet classified in the given packet class. For example, the exemplary classification-to-encoders mapping table 211 illustrates that a first packet class (FIRST CLASS) is mapped to a first ordering of encoders 212 (illustratively, encoder $212_1$, encoder $212_2$, and so forth in numerical order of the subscripts until encoder $212_N$), a second packet class (SECOND CLASS) is mapped to a second ordering of encoders 212 (illustratively, encoder $212_2$, encoder $212_3$, and so forth in numerical order of the subscripts until encoder $212_N$ and then finally encoder $212_1$), and so forth until an N-th packet class (N-th CLASS) is mapped to an N-th ordering of encoders 212 (illustratively, encoder $212_N$, encoder $212_{N-1}$, and so forth in reverse numerical order of the subscripts until encoder $212_1$), and so forth. It is noted that, although primarily depicted with respect to use of specific numbers of packet classes and encoders 212 (and where the number of packet classes is equal to the number of encoders 212), fewer or more packet classes or encoders 212 may be used (and it will be appreciated that a one-to-one relationship between the number of packet classes and the number of encoders 212 is not required). It is noted that, although primarily depicted and described with respect to an embodiment in which the classification-to-encoders mapping table 211 is a single table accessible to each of the encoders 212, N copies of the classification-to-encoders mapping table 211 may be stored on the encoders $212_1$-$212_N$, respectively.

The classifier 210 uses the classification-to-encoders mapping table 211 to determine the set of encoders 212 to be used to encode a received packet. For example, after determining the packet class of a received packet, the classifier 210 may use the determined packet class as a key into the classification-to-encoders mapping table 211 in order to determine the set of encoders 212 to be used to encode the received packet. As described above, the classification-to-encoders mapping table 211 specifies, for each packet class, an order of the encoders 212 which is indicative of the order in which the encoders 212 are to process the packet for encoding the packet. The classifier 210 marks the packet class of the packet within the packet before providing the packet to the first encoder 212 in the encoders list for the packet class. In one embodiment, the classifier 210 marks the packet class within the packet by including the encoders list for the packet class, as determined from classification-to-encoders mapping table 211, within the packet (thereby preventing the encoders 212 in the encoders list for the packet class from having to perform lookups to the classification-to-encoders mapping table 211, because the encoders list is readily available from the packet itself). In one embodiment, the classifier 210 marks the packet class within the packet by marking the packet with a packet class identifier which may then be used by each encoder 212 in the encoders list as a key into the classification-to-encoders mapping table 211. In such embodiments, a current encoder 212 determines its own position within the encoders list for the packet class such that it knows which RE functions to perform for the packet and such that it also can determine the next node (e.g., next encoder 212 or merger 215) to which the packet is to be provided.

The encoders 212 each are configured to support a plurality of RE encoding functions for max-match RE. The RE encoding functions supported by each encoder 212 include (1) computing fingerprints, (2) performing fingerprint lookups, (3) expanding matched regions, and (4) storing packets in a content store (illustratively, respective content stores 213). It is noted that, although primarily depicted and described with respect to embodiments in which each of the encoders 212 is configured to perform each of the four listed RE encoding functions, in at least some embodiments one or more of the encoders 212 may be configured to support fewer of the listed RE encoding functions or other RE encoding functions.

The encoders 212 are configured to know which RE encoding functions to perform for a packet of a packet class based on their positions within the encoders list associated with the packet class as specified in the classification-to-encoders mapping table 211.

The RE encoding functions performed by an encoder 212 for a packet of a packet class depend on whether the encoder 212 is the first encoder 212 in the encoders list for the packet class or a subsequent encoder 212 in the encoders list for the packet class. In one embodiment, the encoders 212 are configured such that the first encoder 212 in the encoders list is responsible for performing each of the four RE encoding functions for a given packet of that packet class and the subsequent encoders 212 in the encoders list each are responsible for performing fingerprint lookups and expanding matched regions for fingerprints not matched and expanded by encoders 212 earlier in the encoders list. As noted above, each encoder 212 can determine its position in the encoders list for a given packet class from the packet itself (e.g., where the classifier 210 adds the encoders list to the packet based on a look up to the classification-to-encoders mapping table 211) or via a look up to the classification-to-encoders mapping table 211 (e.g., based on a packet class identifier included within the packet by the classifier 210). The first encoder 212 in the encoders list for a packet class, upon receiving a packet marked as being associated with that packet class, computes the fingerprints of the packet (which is maintained as a list of computed fingerprints for use by the first encoder 212 in the encoders list as well as one or more subsequent encoders 212 in the encoders list), stores the packet in its associated content store 213, performs fingerprint lookups within its associated fingerprint table 214, and, when a fingerprint match(es) is found, encodes the matched region(s) of the matched fingerprint(s) within the packet, removes the matched fingerprint(s) from the list of computed fingerprints, and passes the encoded packet and the updated list of computed fingerprints to the next encoder 212 in the encoders list for that packet class. Each subsequent encoder 212 in the encoders list for the packet class (i.e., all those except for the first encoder 212 in the encoders list for the packet class) receives the encoded packet from the previous encoder 212 in the encoders list, perform fingerprint lookups within its associated fingerprint table 214, and, when a fingerprint match(es) is found, encodes the matched region(s) of the matched fingerprint(s) within the packet, removes the matched fingerprint(s) from the list of computed fingerprints, and passes the encoded packet and the updated list of computed fingerprints to the next encoder 212 in the encoders list for that packet class. The final encoder 212 in the encoders list, after performing its functions as a subsequent encoder 212 in the encoders list for that packet class, provides the encoded packet to merger 215.

The merger 215 receives encoded packets from encoders 212 and propagates the encoded packets (e.g., via WAN 120 via which the encoded packets may be delivered to RE decoding middlebox $112_D$).

In this manner, the RE encoding functions may be distributed (and, thus, load-balanced) across the various encoders 212 and, similarly, the storage and processing associated with the RE encoding functions is distributed (and, thus, load-balanced) across the various encoders 212. Since the packets are classified and provided to different ones of the encoders 212 operating as first encoders in the different lists of encoders 212 for the different packet classes, the storage of the packets is distributed across the content stores of the 213 of the encoders 212, respectively. Similarly, since the packets are classified and provided to different ones of the encoders 212 operating as first encoders in the different lists of encoders 212 for the different packet classes, the maintenance of fingerprints used for RE is distributed across the fingerprint tables 214 of the encoders 212, respectively. Since the packets are classified and provided to the encoders 212 operating as subsequent encoders in different orders based on the different lists of encoders 212 for the different packet classes, the processing of packets for replacing fingerprints with encoded regions is distributed across the encoders 212, respectively. The various benefits of configuring RE encoding middlebox $200_E$ in this manner may be better understood by way of reference to FIG. 4.

Figure 3:
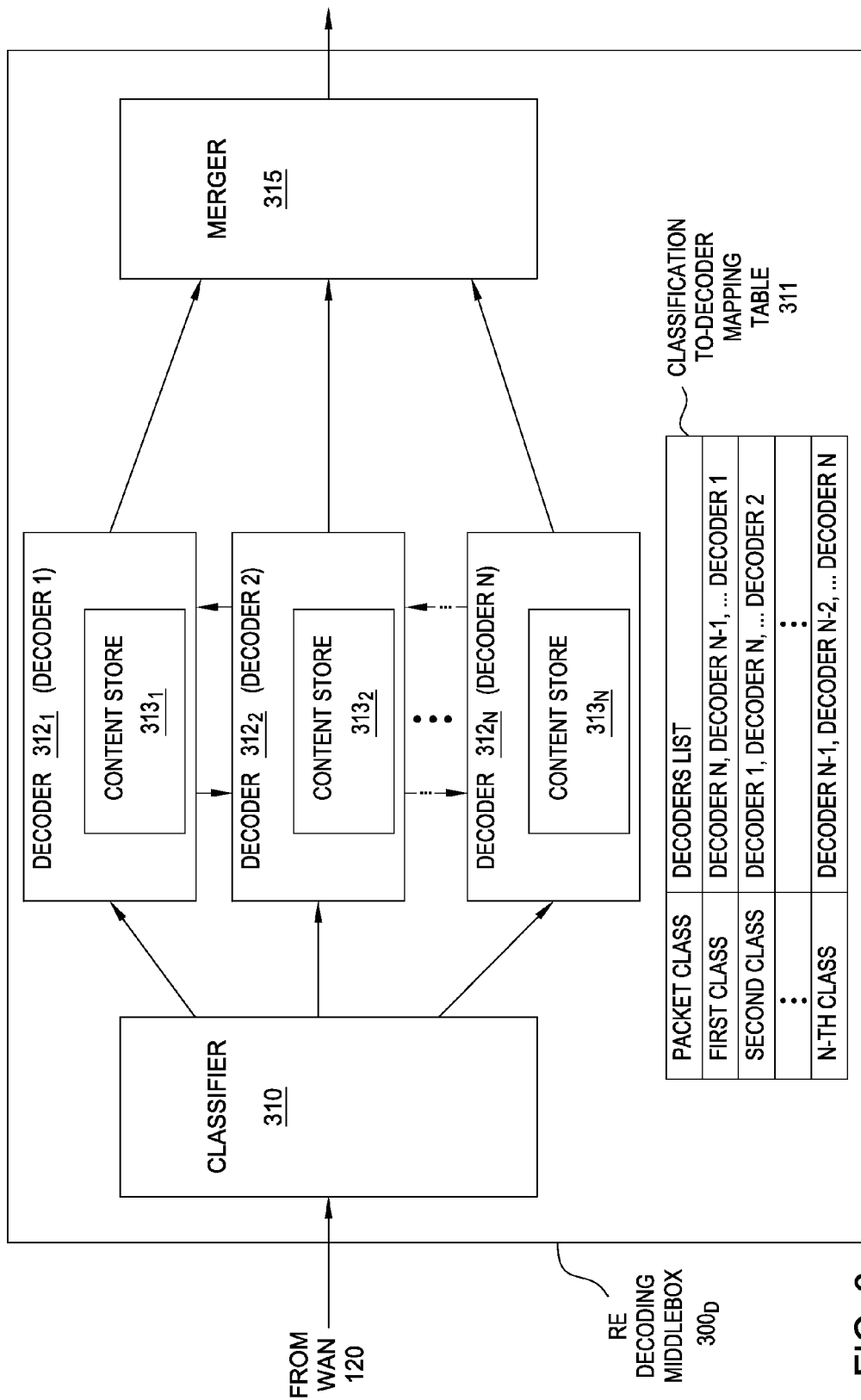
FIG. 3 depicts an exemplary embodiment of an RE decoding middlebox for max-match RE.

FIG. 3 depicts an exemplary embodiment of an RE decoding middlebox for max-match RE. More specifically, FIG. 3 depicts an exemplary embodiment of RE decoding middlebox $112_D$ for max-match RE (denoted as RE decoding middlebox $300_D$).

The RE decoding middlebox $300_D$ of FIG. 3 is configured to operate in a manner similar to the RE encoding middlebox $200_E$ of FIG. 2, with the RE decoding middlebox $300_D$ performing RE decoding functions complementary to the RE encoding functions performed by RE encoding middlebox $200_E$.

The RE decoding middlebox $300_D$ includes a classifier 310, a classification-to-decoders mapping table 311, a plurality of decoders $312_1$-$312_N$ (collectively, decoders 312), and a merger 315. The decoders $312_1$-$312_N$ include a plurality of content stores $313_1$-$313_N$ (collectively, content stores 313), respectively.

The classifier 310 is configured to communicate with each of the decoders 312. The merger 315 also is configured to communicate with each of the decoders 312. The decoders 312 are configured to communicate with each other and it is noted that, although primarily depicted as communicating with each other serially (illustratively, decoder $312_1$ communicating with decoder $312_2$, and so forth, as well as in the opposite order), in at least some embodiments any decoder 312 may communicate with any other decoder 312 directly (i.e., without traversing other decoders 312) or indirectly without traversing the depicted order of decoders 312.

The RE decoding middlebox $300_D$ is configured such that packets are classified by classifier 310 and then processed by decoders 312 in a different manner (e.g., processed by different subsets of decoders 312, processed by decoders 312 using different orders of decoders 312, or the like, as well as various combinations thereof) based on the packet classes of the packets as determined by classifier 310.

The classifier 310 receives packets, determines classifications of the received packets, and marks the classifications of the received packets within the packets, respectively. The RE decoding middlebox $300_D$ may support any suitable numbers and types of packet classes which may be based on any suitable criteria. For example, classification of received packets by classifier 310 may be performed in a round-robin manner, using load-balancing based on packet sizes of the packets, or the like. In one embodiment, the set of packet classes supported by the RE decoding middlebox $300_D$ is the same as the set of packet classes supported by the RE encoding middlebox $112_E$. The classifier 310 provides the classified packets to the decoders 312 in accordance with the classification-to-decoders mapping table 311.

The classification-to-decoders mapping table 311 specifies, for each of the packet classes, a mapping of the packet class to the respective manner in which decoders 312 are to be used to decode packets of that packet class. For a given packet class, the manner in which decoders 312 are to be used to decode packets of the packet class is specified as a decoders list, where the order of the decoders 312 in the decoders list specifies the order in which the decoders 312 are to operate on each packet classified in the given packet class. In one embodiment, for each packet class, the order of the decoders 312 in the decoders list is the reverse of the order of encoders 212 of the encoders list as specified in the classification-to-encoders mapping table 211 of RE encoding middlebox $200_E$. For example, the exemplary classification-to-decoders mapping table 311 of FIG. 3 illustrates that a first packet class (FIRST CLASS) is mapped to a first ordering of decoders 312 (illustratively, decoder $312_N$, decoder $312_{N-1}$, and so forth in numerical order of the subscripts until decoder $312_1$), a second packet class (SECOND CLASS) is mapped to a second ordering of decoders 312 (illustratively, decoder $312_{N-1}$, decoder $312_{N-2}$, and so forth in numerical order of the subscripts until decoder $312_1$ and then finally decoder $312_N$), and so forth until an N-th packet class (N-th CLASS) is mapped to an N-th ordering of decoders 312 (illustratively, decoder $312_1$, decoder $312_2$, and so forth in numerical order of the subscripts until decoder $312_N$), and so forth. It is noted that, although primarily depicted and described with respect to use of specific numbers of packet classes and decoders 312 (and where the number of packet classes is equal to the number of decoders 312), fewer or more packet classes or decoders 312 may be used (and it will be appreciated that a one-to-one relationship between the number of packet classes and the number of decoders 312 is not required). It is noted that, although primarily depicted and described with respect to an embodiment in which the classification-to-decoders mapping table 311 is a single table accessible to each of the decoders 312, N copies of the classification-to-decoders mapping table 311 may be stored on the decoders $312_1$ - $312_N$, respectively.

The classifier 310 uses the classification-to-decoders mapping table 311 to determine the set of decoders 312 to be used to decode a received packet. For example, after determining the packet class of a received packet, the classifier 310 may use the determined packet class as a key into the classification-to-decoders mapping table 311 in order to determine the set of decoders 312 to be used to decode the received packet. As described above, the classification-to-decoders mapping table 311 specifies, for each packet class, an order of the decoders 312 which is indicative of the order in which the decoders 312 are to process the packet for decoding the packet. The classifier 310 marks the packet class of the packet within the packet before providing the packet to the first decoder 312 in the decoders list for the packet class. In one embodiment, the classifier 310 marks the packet class within the packet by including the decoders list for the packet class, as determined from classification-to-decoders mapping table 311, within the packet (thereby preventing the decoders 312 in the decoders list for the packet class from having to perform lookups to the classification-to-decoders mapping table 311, because the decoders list is readily available from the packet itself). In one embodiment, the classifier 310 marks the packet class within the packet by marking the packet with a packet class identifier which may then be used by each decoder 312 in the decoders list as a key into the classification-to-decoders mapping table 311. In such embodiments, a current decoder 312 determines its own position within the decoders list for the packet class such that it knows which RE functions to perform for the packet and such that it also can determine the next node (e.g., next decoder 312 or merger 315) to which the packet is to be provided.

The decoders 312 each are configured to support a plurality of RE decoding functions for max-match RE. The RE decoding functions supported by each decoder 312 include (1) decoding encoding keys, (2) performing lookups for packets identified by encoding keys, (3) replacing encoding keys with corresponding portions of packets identified by encoding keys, and (4) storing packets in a content store (illustratively, respective content stores 313). It is noted that, although primarily depicted and described with respect to embodiments in which each of the decoders 312 is configured to perform each of the four listed RE decoding functions, in at least some embodiments one or more of the decoders 312 may be configured to support fewer of the listed RE decoding functions or other RE decoding functions.

The decoders 312 are configured to know which RE decoding functions to perform for a packet of a packet class based on their positions within the decoders list associated with the packet class as specified in the classification-to-decoders mapping table 311.

The RE decoding functions performed by a decoder 312 for a packet of a packet class depend on whether the decoder 312 is a first decoder 312 in the decoders list for the packet class, an intermediate decoder 312 in the decoders list for the packet class, or the final decoder 312 in the decoders list for the packet class. In one embodiment, the decoders 312 are configured such that the first decoder 312 in the decoders list is responsible for performing the first RE decoding function (namely, decoding encoding keys), each of the decoders 312 in the decoders list is responsible for performing the second and third RE decoding functions (namely, performing lookups for packets identified by encoding keys and replacing encoding keys with corresponding portions of packets identified by encoding keys), and the final decoder 312 in the decoders list is responsible for performing the fourth RE decoding function (namely, storing packets in its content store). As noted above, each decoder 312 can determine its position in the decoders list for a given packet class from the packet itself (e.g., where the classifier 310 adds the decoders list to the packet based on a look up to the classification-to-decoders mapping table 311) or via a look up to the classification-to-decoders mapping table 311 (e.g., based on a packet class identifier included within the packet by the classifier 310). The first decoder 312 in the decoders list for a packet class, upon receiving a packet marked as being associated with that packet class, identifies and decodes each of the encoding keys included within the received packet (e.g., put there by RE encoding middlebox $112_E$ during RE-based encoding of the packet). The first decoder 312 in the decoders list for the packet class then performs lookups for each of the encoding keys using its content store 313 and, for each encoding key for which a matching packet is identified in the content store 313 of the first decoder 312, replaces the encoding key in the received packet with the corresponding portion of the stored packet identified from the content store 313 of the first decoder 312. The first decoder 312 in the decoders list for the packet class then passes the received packet and the remaining encoding keys (i.e., those that the first decoder 312 was unable to process) to the second decoder 312 in the decoders list for the packet class. The second decoder 312 in the decoders list for the packet class performs lookups for each of the remaining encoding keys (received from the first decoder 312) using its content store 313 and, for each encoding key for which a matching packet is identified in the content store 313 of the second decoder 312, replaces the encoding key in the received packet with the corresponding portion of the stored packet identified from the content store 313 of the second decoder 312. The second decoder 312 in the decoders list for the packet class then passes the received packet and the remaining encoding keys (i.e., those that the first and second decoders 312 were unable to process) to the third decoder 312 in the decoders list for the packet class. The packet continues to be processed and passed in this manner until reaching the final decoder 312 in the decoders list for the packet class. The final decoder 312 in the decoders list for the packet class performs lookups for each of the remaining encoding keys (received from the next-to-final decoder 312) using its content store 313 and, for each encoding key for which a matching packet is identified in the content store 313 of the final decoder 312, replaces the encoding key in the received packet with the corresponding portion of the stored packet identified from the content store 313 of the second decoder 312. Thus, following processing of the received packet by the final decoder 312 in the decoders list for the packet class, the complete packet (i.e., the original packet before it was encoded by RE encoding middlebox $112_E$ during RE-based encoding of the packet) is restored. The final decoder 312 in the decoders list for the packet class stores the packet in its content store 313. The final decoder 312 in the decoders list for the packet class provides the recovered packet to the merger 315.

The merger 315 receives decoded packets from decoders 312 and propagates the decoded packets.

In this manner, the RE decoding functions may be distributed (and, thus, load-balanced) across the various decoders 312 and, similarly, the storage and processing associated with the RE decoding functions is distributed (and, thus, load-balanced) across the various decoders 312. For example, since the packets are classified and provided to different ones of the decoders 312 operating as first decoders in the different lists of decoders 312 for the different packet classes, the processing of encoding keys of received packets is distributed across the decoders 312, respectively. For example, since the packets are classified and provided to different chains of decoders 312 for the different packet classes, the storage of the packets is distributed across the content stores of the 313 of the decoders 312, respectively. For example, since storage of the packets is distributed across the decoders 312, processing of packets to replace encoding keys of packets with content of stored packets also is distributed across the decoders 312. The various benefits of configuring RE decoding middlebox $300_D$ in this manner may be better understood by way of reference to FIG. 4.

Figure 4:
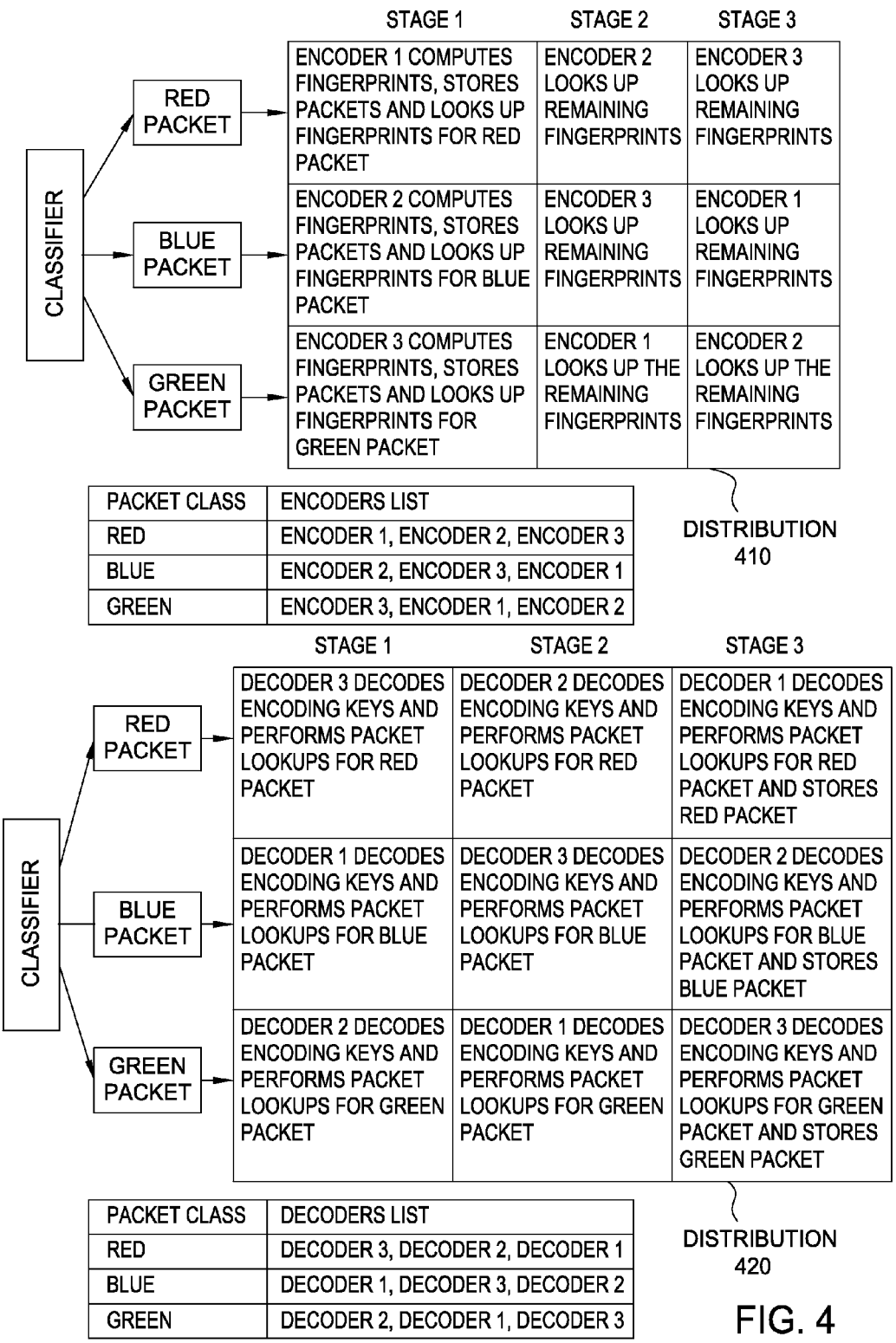
FIG. 4 depicts exemplary distributions of RE functions across different processing stages for an exemplary RE encoding middlebox having three encoders and an exemplary RE decoding middlebox having three decoders.

FIG. 4 depicts exemplary distributions of RE functions across different processing stages for an exemplary RE encoding middlebox having three encoders and an exemplary RE decoding middlebox having three decoders. As described herein, the RE encoding middlebox $200_E$ splits the RE processing across multiple encoders 212 and uses and effectively large memory. In max-match RE, the RE encoding functions to be performed for each packet include (1) computing fingerprints, (2) performing fingerprint lookups, (3) expanding matched regions, and (4) storing packets in a content store.

With respect to the first and fourth RE encoding functions, it is noted that, in one embodiment, the first and fourth functions are assigned only to the first node in the list of nodes for a given packet class. If an assumption is made each packet class includes random permutations of the encoders 212 and that the classifier 210 splits packets equally among all of the packet classes, then, with high probability, each encoder 212 will have approximately equal responsibility of the first and fourth RE encoding functions. Thus, the first and fourth RE encoding functions would be equally split across multiple encoders 212.

With respect to the third RE encoding function, it is noted that the third RE encoding function also is automatically split across the encoders 212 (e.g., in a simple round-robin policy, the packets will be stored approximately equally among all of the encoders 212 and, thus, there is high likelihood that the matching regions also will be split approximately equally among all of the encoders 212). In one embodiment, classifier 210 may be configured to use one or more policies configured to enforce an even split amongst each of the encoders 212.

With respect to the second RE encoding function, however, it is noted that the fingerprint lookup function may not be split amongst the encoders 212. However, given that the other three RE encoding functions are split across the encoders 212 and that in-memory fingerprint lookups are relatively inexpensive compared to the other RE encoding functions, there is no significant negative impact if the fingerprint lookups are not be evenly split amongst the encoders 212.

As a result, each encoder 212 is performing some RE encoding functions at every stage. This is illustrated in FIG. 4, where the exemplary distribution 410 depicts distribution of RE encoding functions across different processing stages for an exemplary implementation of RE encoding middlebox $212_E$ having three encoders (denoted as Encoder 1, Encoder 2, and Encoder 3). The exemplary implementation of RE encoding middlebox $212_E$ supports three packet classes denoted as RED, BLUE, and GREEN, where the RED packet class has a first encoder list (Encoder 1, Encoder 2, Encoder 3), the BLUE packet class has a second encoder list (Encoder 2, Encoder 3, Encoder 1), and the GREEN packet class has a third encoder list (Encoder 3, Encoder 1, Encoder 2). In Stage 1 of exemplary distribution 410, Encoder 1 computes fingerprints, stores packets, and performs fingerprint lookups for a RED packet, Encoder 2 computes fingerprints, stores packets, and performs fingerprint lookups for a BLUE packet, and Encoder 3 computes fingerprints, stores packets, and performs fingerprint lookups for a GREEN packet. In Stage 2 of exemplary distribution 410, Encoder 1 performs fingerprint lookups for remaining fingerprints of the GREEN packet, Encoder 2 performs fingerprint lookups for remaining fingerprints of the RED packet, and Encoder 3 performs fingerprint lookups for remaining fingerprints of the BLUE packet. In Stage 3 of exemplary distribution 410, Encoder 1 performs fingerprint lookups for remaining fingerprints of the BLUE packet, Encoder 2 performs fingerprint lookups for remaining fingerprints of the GREEN packet, and Encoder 3 performs fingerprint lookups for remaining fingerprints of the RED packet. From exemplary distribution 410 it may be seen that, since each encoder performs lookups to its fingerprint table to find matches for each packet, the effective memory used for RE is the sum of the memory available on all the encoders 212.

As described herein, the RE decoding middlebox $300_D$ splits the RE processing across multiple decoders 312 and uses and effectively large memory. In max-match RE, the RE decoding functions to be performed for each packet include (1) decoding encoding keys, (2) performing lookups for packets identified by encoding keys, (3) replacing encoding keys with corresponding portions of packets identified by encoding keys, and (4) storing packets in a content store. It will be appreciated that RE decoding is scaled up in a manner similar to RE encoding (and, thus, a detailed description of such scaling is omitted for brevity).

As a result, each decoder 312 is performing some RE decoding functions at every stage. This is illustrated in FIG. 4, where the exemplary distribution 420 depicts distribution of RE decoding functions across different processing stages for an exemplary implementation of RE decoding middlebox $212_D$ having three decoders (denoted as Decoder 1, Decoder 2, and Decoder 3). The exemplary implementation of RE decoding middlebox $212_D$ supports three packet classes denoted as RED, BLUE, and GREEN, where the RED packet class has a first decoder list (Decoder 3, Decoder 2, Decoder 1), the BLUE packet class has a second decoder list (Decoder 1, Decoder 3, Decoder 2), and the GREEN packet class has a third decoder list (Decoder 2, Decoder 1, Decoder 3). In Stage 1 of exemplary distribution 420, Decoder 3 decodes encoding keys and performs packet lookups for the RED packet, Decoder 1 decodes encoding keys and performs packet lookups for the BLUE packet, and Decoder 2 decodes encoding keys and performs packet lookups for the GREEN packet. In Stage 2 of exemplary distribution 420, Decoder 2 decodes encoding keys and performs packet lookups for the RED packet, Decoder 3 decodes encoding keys and performs packet lookups for the BLUE packet, and Decoder 1 decodes encoding keys and performs packet lookups for the GREEN packet. In Stage 3 of exemplary distribution 420, Decoder 1 decodes encoding keys and performs packet lookups for the RED packet and then also stores the RED packet, Decoder 2 decodes encoding keys and performs packet lookups for the BLUE packet and then also stores the BLUE packet, and Decoder 3 decodes encoding keys and performs packet lookups for the GREEN packet and then also stores the GREEN packet.

It is noted that one or more additional features may be provided to further control scaling of processing and memory related to providing RE encoding or decoding functions.

In one embodiment, potential increases in bandwidth usage within the first cloud $110_1$ and the second cloud $110_2$ due to use of RE encoding middlebox $112_E$ and RE decoding middlebox $112_D$ (e.g., where each packet is directed to traverse each encoder 212 of RE encoding middlebox $200_E$ and each decoder 312 of RE decoding middlebox $300_D$), respectively, may be controlled using one or more tunable parameters adapted for varying the amount of bandwidth used or the amount of memory scaled. For example, four RE middleboxes may be used to provide a scaling factor of two for memory, while network traffic is only allowed to flow through two of the RE middleboxes. It will be appreciated that other levels of scaling may be supported.

In one embodiment, a capability for dynamically adding and removing data processors (e.g., encoders 212 in the case of RE encoding middlebox $200_E$ and decoders 312 in the case of RE decoding middlebox $300_D$) may be provided. In this embodiment, when a new data processor is added, the new data processor starts receiving traffic and, thus, begins to add packets to its content store for use in performing RE functions. In this embodiment, when an existing data processor is removed, the content store of the data processor may be dropped or may be distributed across some or all of the remaining data processors.

In one embodiment, Bloom filters may be used to reduce disk lookups. It is noted that, for a relatively large content store, the associated fingerprint table may not fit in memory. In that case, at least part of the fingerprint table would have to be maintained on disk. This is undesirable, because disk lookup operations are expensive compared to memory lookup operations. Accordingly, in one embodiment, Bloom filters may be leveraged to reduce disk lookups. As opposed to hash tables, Bloom filters are space-efficient data structures and can fit in memory. If a fingerprint is present, then Bloom filter lookups would be successful; however, if the fingerprint is not present, then Bloom filter lookups may still be successful (e.g., case of false positives).

Thus, the Bloom filters should be configured properly to ensure that the probability of false positive is low. In this way, it is possible to ensure with high probability that lookups go to disk when the fingerprint is present in the fingerprint table. When the fingerprint is present, the corresponding matched region is determined. As discussed earlier, the match expansion function gets split almost equally across the encoders 212. Thus, by using such Bloom filters, disk I/O operations may be balanced among the encoders 212.

In one embodiment, RE encoding middlebox $112_E$ and RE decoding middlebox $112_D$ are configured to support chunk-match RE capabilities. This is depicted and described with respect to FIGS. 5 and 6.

Figure 5:
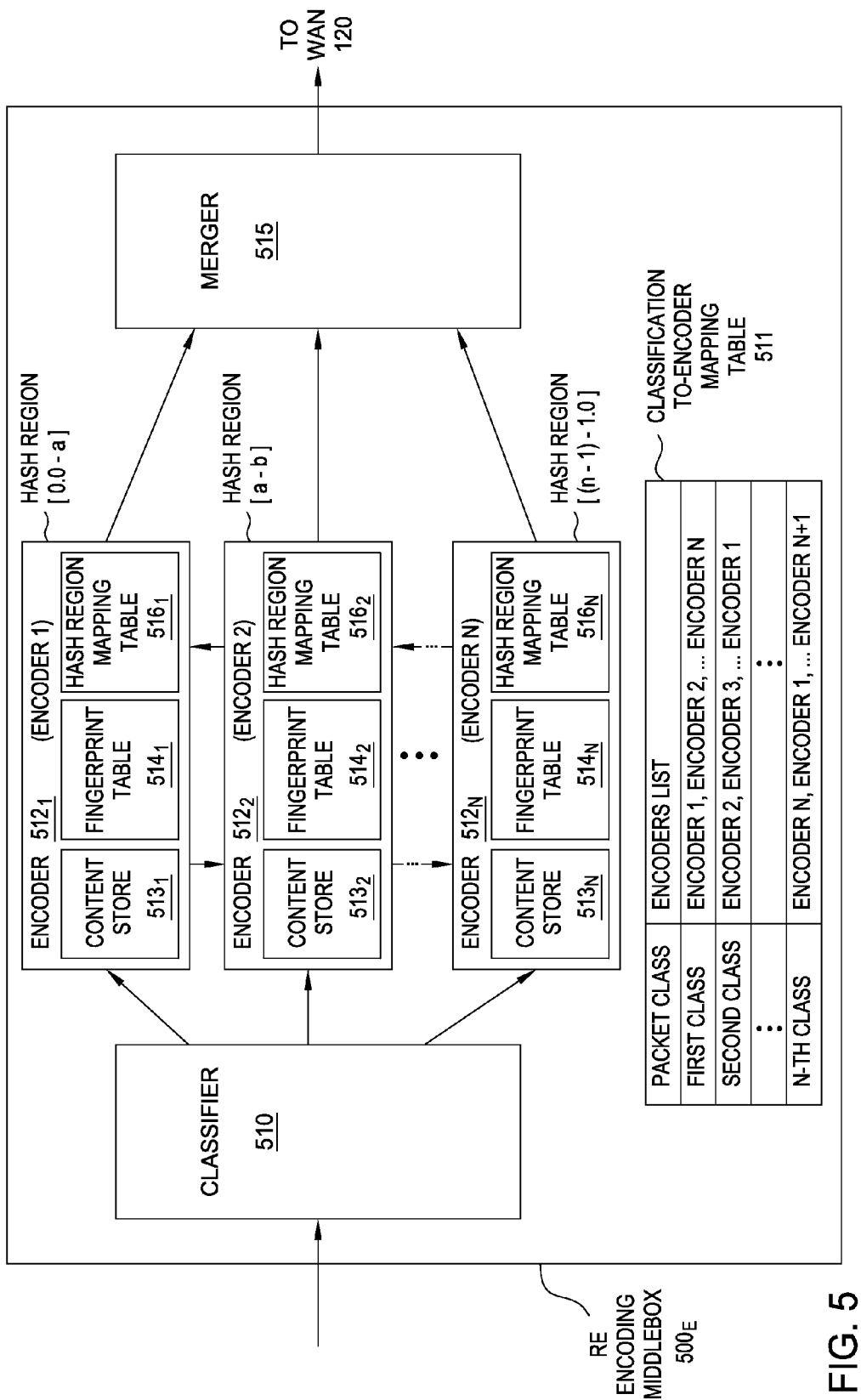
FIG. 5 depicts an exemplary embodiment of an RE encoding middlebox for chunk-match RE.

FIG. 5 depicts an exemplary embodiment of an RE encoding middlebox for chunk-match RE. More specifically, FIG. 5 depicts an exemplary embodiment of RE encoding middlebox $112_E$ for chunk-match RE (denoted as RE encoding middlebox $500_E$).

It is noted that the chunk-match RE approach is similar to the max-match RE approach that is depicted and described with respect to FIG. 2 and FIG. 3, except that chunks of packets (rather than the packets) are stored and used for RE encoding. Accordingly, the RE encoding middlebox $500_E$ for chunk-match RE is similar to the RE encoding middlebox $200_E$ for max-match RE.

The RE encoding middlebox $500_E$ includes a classifier 510, a classification-to-encoders mapping table 511, a plurality of encoders $512_1$-$512_N$ (collectively, encoders 512), and a merger 515. The encoders $512_1$-$512_N$ include a plurality of content stores $513_1$-$513_N$ (collectively, content stores 513), a plurality of fingerprint tables $514_1$-$514_N$ (collectively, fingerprint tables 514), and a plurality of hash region mapping tables $516_1$-$516_N$ (collectively, hash region mapping table 516), respectively.

The classifier 510 is configured to communicate with each of the encoders 512. The merger 515 also is configured to communicate with each of the encoders 512. The encoders 512 are configured to communicate with each other and it is noted that, although primarily depicted as communicating with each other serially (illustratively, encoder $512_1$ communicating with encoder $512_2$, and so forth, as well as in the opposite order), in at least some embodiments any encoder 512 may communicate with any other encoder 512 directly (i.e., without traversing other encoders 512) or indirectly without traversing the depicted order of encoders 512.

In general, the configuration/operation of classifier 510, classification-to-encoders mapping table 511, encoders 512, and merger 515 of FIG. 5 is similar to the configuration/operation of classifier 210, classification-to-encoders mapping table 211, encoders 212, and merger 215 of FIG. 2, respectively. However, rather than the encoders 512 being configured to store packets classified by the classifier 510, the encoders 512 are configured to split packets classified by the classifier 510 into chunks and to store the chunks (rather than the packets from which the chunks are generated) in the content stores 513 of the encoders 512. In one embodiment, for a packet in a given packet class, the first encoder 512 in the encoders list for the given packet class is responsible for splitting the packet into chunks. The chunks of the packets may be handled by the encoders 512 in any suitable manner.

In one embodiment (as depicted in FIG. 5), the chunk storing and processing responsibilities are split across the encoders 512 based on hash regions.

In one embodiment, each encoder $512_1$-$512_N$ is assigned a hash region, respectively. In one embodiment, first encoder $512_1$ is assigned a hash region [0.0-a], second encoder $512_2$ is assigned a hash region [a-b], and so forth until next-to-last encoder $512_{N-1}$ is assigned a hash region [(n−2)-(n−1)] and last encoder $512_N$ is assigned a hash region [(n−1)-1.0]. It is noted that these hash regions are merely exemplary and that any suitable numbers of hash regions of any suitable size may be assigned to encoders 512. It is noted that, although primarily depicted and described with respect to embodiments in which each encoder 512 has only a single hash region assigned thereto, one or more encoders 512 may have multiple hash regions assigned thereto.

In one embodiment, the encoders 512 are configured such that (1) an encoder 512 stores a chunk if a hash computed for the chunk falls within the hash region assigned to the encoder 512 and (2) an encoder 512 performs a lookup for a chunk if the chunk has an associated hash that falls within the hash region assigned to the encoder 512.

In one embodiment, mappings of the hash regions to the encoders 512 responsible for the hash regions are maintained in the hash region mapping tables $516_1$-$516_N$ (i.e., each encoder 512 has information indicative of which hash regions map to which encoders 512). It is noted that, although primarily depicted and described with respect to embodiments in which mappings of the hash regions to the encoders 512 responsible for the hash regions are maintained using N hash region mapping tables $516_1$-$516_N$ implemented on the encoders $512_1$-$512_N$, respectively, the mappings of the hash regions to the encoders 512 responsible for the hash regions may be maintained using a single hash region mapping table that is accessible to each of the encoders 512 or using multiple hash region mapping tables accessible to respective subsets of the encoders 512.

The operation of RE encoding middlebox $500_E$ may be better understood by considering the manner in which a packet is processed for RE encoding when received at RE encoding middlebox $500_E$. The classifier 510 classifies the packet into an associated packet class. The classifier 510 provides the packet to a first encoder 512 in the encoders list specified for the packet class as determined by the classifier 510 from the classification-to-encoders mapping table 511. The first encoder 512 splits the packet into chunks. The first encoder 512 computes respective hashes for each of the chunks. The first encoder 512 performs fingerprint lookups for any chunks having hashes falling within the hash region assigned to the first encoder 512. The first encoder 512 performs encoding of the packet for each chunk having a hash falling within the hash region assigned to the first encoder 512 (i.e., for each fingerprint match found for each chunk for which the first encoder 512 is responsible, the matched chunk of the packet is replaced with an associated encoding key). The first encoder 512 then selects the next encoder 512 to which the packet is to be provided. The first encoder 512 selects the next encoder 512 to which the packet is to be provided based on (1) the hashes for the remaining chunks of the packet (i.e., the hash or hashes identified by the first encoder 512, but falling outside of the hash region for which the first encoder 512 is responsible), (2) the mappings of the hash regions to the encoders 512 responsible for the hash regions (as specified in the hash region mapping tables 516 of the first encoder 512), and (3) the encoders list for the packet class (as specified in the packet itself or available from the classification-to-encoders mapping table 511). For example, the first encoder 512 may (1) search its hash region mapping table 516, using the remaining hashes of the packet, in order to identify one or more other encoders 512 responsible for one or more of the remaining hashes of the packet (where the remaining hashes of the packet are those hashes that are computed by the first encoder 512 but which fall outside of the hash region for which the first encoder 512 is responsible) and (2) select the next encoder 512 from the one or more other encoders 512 based on the encoders list for the packet class. For example, the first encoder 512 may select the identified other encoder 512 that is next on the encoders list for the packet class. The next encoder 512 then (1) performs encoding of the packet for each chunk having a hash falling within the hash region assigned to the next encoder 512 and (2) determines the next element to which the packet is to be propagated (another encoder 512 or merger 515). The encoding of the packet continues in this manner until the packet is fully encoded and provided to the merger 515. It is noted that use of the hash region mapping tables 516 may obviate the need for the packet to be passed through all of the encoders 512 (e.g., where some of the encoders 512 have associated hash regions that are not applicable to any of the chunks of the packet), thereby resulting in a reduction in bandwidth usage in order to encode the packet. It is noted that, although the foregoing description assumes that multiple encoders 512 will be used to encode a packet (for purposes of illustrating use of multiple encoders 512 to encode a packet), it is possible that a packet may be fully encoded by the first encoder 512 and passed directly from the first encoder 512 to the merger 515.

For example, consider the case of an RE encoding middlebox $500_E$ having three encoders $512_1$-$512_3$. In this example, the hash regions may be assigned to the encoders 512 as follows: encoder $512_1$ (hash region 0.0-0.3), encoder $512_2$ (hash region 0.3-0.6), and encoder $512_3$ (hash region 0.6-1.0). In this example, encoder $512_1$ performs hash lookups and stores hashes only for chunks having hashes in the 0.0-0.3 hash region, encoder $512_2$ performs hash lookups and stores hashes only for chunks having hashes in the 0.3-0.6 hash region, and encoder $512_3$ performs hash lookups and stores hashes only for chunks having hashes in the 0.6-1.0 hash region. Thus, the RE operations can be balanced across the three encoders 512.

In this manner, the chunk lookups and the chunk stores may be distributed across the encoders 512 in any suitable manner (e.g., equally, nearly equally, or in any other suitable manner) by splitting the hash regions appropriately.

In one embodiment, the hash regions may be dynamically monitored and reconfigured. This may be performed in a manner for ensuring that the chunk lookups and the chunk stores remain distributed across the encoders 512. In one embodiment, statistics are maintained regarding the manner in which the chunk hashes are falling into different hash regions (e.g., the load on the hash regions) and, based on such statistics, the hash regions may be dynamically reconfigured. The dynamic reconfiguration may include change the sizes of the hash regions assigned to the encoders 512, combining hash regions, splitting hash regions, removing one or more encoders 512 and reassigning hash regions, adding one or more encoders 512 and reassigning hash regions, or the like, as well as various combinations thereof.

In one embodiment, dynamic addition or removal of encoders 512 to/from RE encoding middlebox $500_E$ may be supported. The hash regions of one or more of existing encoders 512 of RE encoding middlebox $500_E$ may be modified when a new encoder 512 is added to RE encoding middlebox $500_E$ and when an existing encoder is removed from RE encoding middlebox $500_E$. For example, if the RE encoding middlebox $500_E$ includes four encoders 512 having hash regions of [0.0-0.25], [0.25-0.50], [0.50-0.75], and [0.75-1.0], respectively, and a new encoder 512 is added, the new encoder 512 may be assigned responsibility for each of hash regions of [0.2-0.25], [0.45-0.50], [0.70-0.75], and [0.95-1.0] (i.e., taking responsibility for only a small portion of the existing hash regions of each of the existing encoders). For example, if the RE encoding middlebox $500_E$ includes four encoders 512 having hash regions of [0.0-0.25], [0.25-0.50], [0.50-0.75], and [0.75-1.0], respectively, and the fourth encoder 512 which is responsible for the hash region of [0.75-1.0] is removed from RE encoding middlebox $500_E$, the first encoder 512 may be assigned responsibility for hash region [0.75-0.83], the second encoder 512 may be assigned responsibility for hash region [0.84-0.92], and the third encoder 512 may be assigned responsibility for hash region [0.93-1.0]. It is noted that the foregoing examples are merely exemplary and that more sophisticated policies may be applied for controlling distribution of hash regions to encoders 512.

In one embodiment (which is omitted for purposes of clarity), the chunk storing and processing responsibilities are split across the encoders 512 without using hash regions. In one embodiment, each chunk of a given packet is stored in the content store 513 of the encoder 512 which split the packet into the chunks (i.e., the first encoder 512 in the encoders list associated with the packet class of the packet). In one embodiment, since hash regions are not used, each packet is required to traverse each of the encoders 512 in the encoders list for the packet class of the packet, such that the hashes of each of the chunks can be checked by the encoders 512 for RE encoding of the packet.

Figure 6:
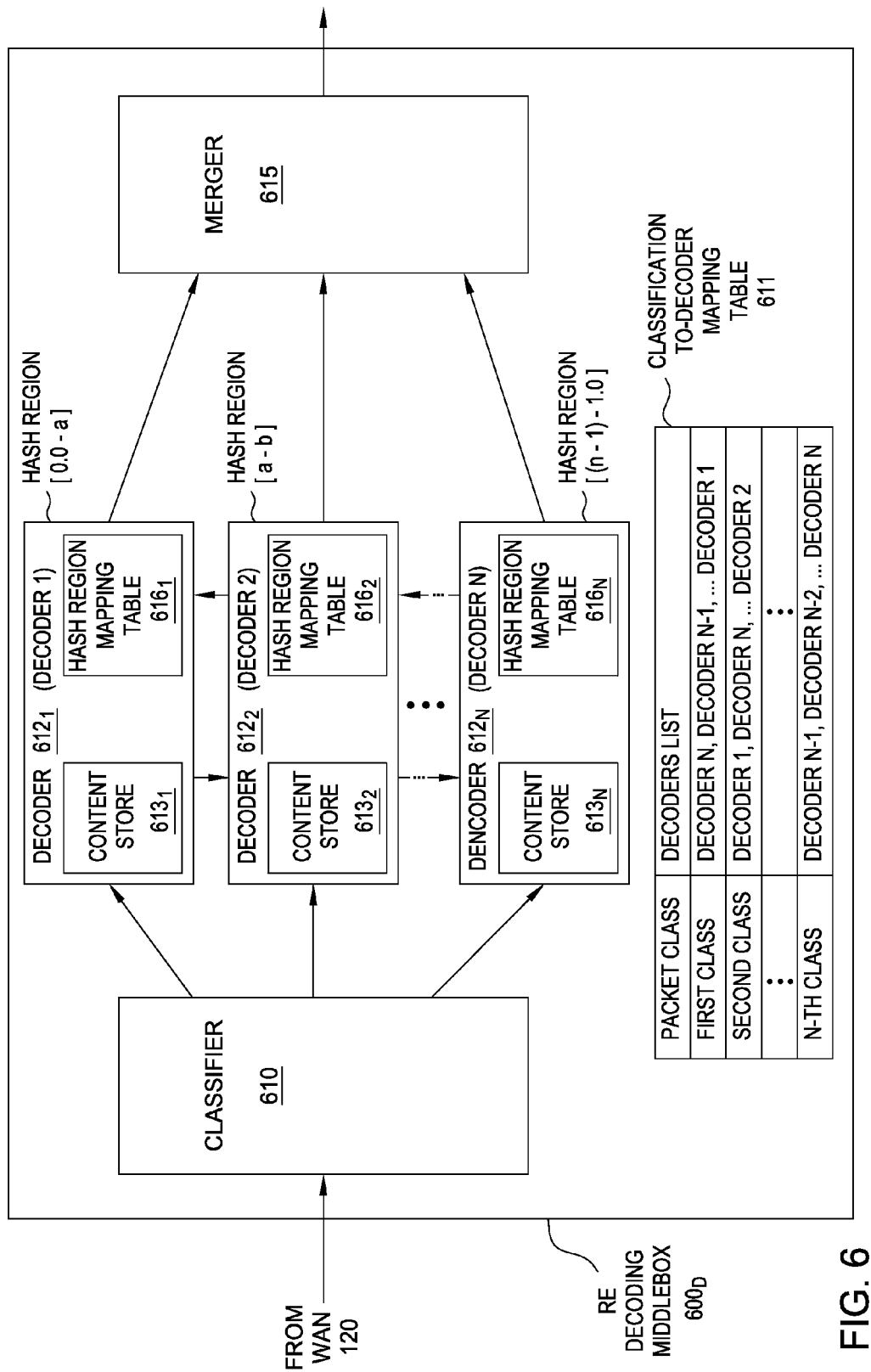
FIG. 6 depicts an exemplary embodiment of an RE decoding middlebox for chunk-match RE.

FIG. 6 depicts an exemplary embodiment of an RE decoding middlebox for chunk-match RE. More specifically, FIG. 6 depicts an exemplary embodiment of RE decoding middlebox 112$_D$ for chunk-match RE (denoted as RE decoding middlebox 600$_D$).

It is noted that the chunk-match RE approach is similar to the max-match RE approach that is depicted and described with respect to FIG. 2 and FIG. 3, except that chunks of packets (rather than the packets) are stored and used for RE encoding. Accordingly, the RE decoding middlebox 600$_E$ for chunk-match RE is similar to the RE decoding middlebox 300$_D$ for max-match RE.

It is further noted that the RE decoding middlebox 600$_D$ of FIG. 6 is configured to operate in a manner similar to the RE encoding middlebox 500$_E$ of FIG. 5, with the RE decoding middlebox 600$_D$ performing RE decoding functions complementary to the RE encoding functions performed by RE encoding middlebox 500$_E$.

The RE decoding middlebox 600$_D$ includes a classifier 610, a classification-to-decoders mapping table 611, a plurality of decoders 612$_1$-612$_N$ (collectively, decoders 612), and a merger 615. The decoders 612$_1$-612$_N$ include a plurality of content stores 613$_1$-613$_N$ (collectively, content stores 613) and a plurality of hash region mapping tables 616$_1$-616$_N$ (collectively, hash region mapping tables 616), respectively.

The classifier 610 is configured to communicate with each of the decoders 612. The merger 615 also is configured to communicate with each of the decoders 612. The decoders 612 are configured to communicate with each other and it is noted that, although primarily depicted as communicating with each other serially (illustratively, decoder 612$_1$ communicating with decoder 612$_2$, and so forth, as well as in the opposite order), in at least some embodiments any decoder 612 may communicate with any other decoder 612 directly (i.e., without traversing other decoders 612) or indirectly without traversing the depicted order of decoders 612.

In general, the configuration/operation of classifier 610, classification-to-decoders mapping table 611, decoders 612, and merger 615 of FIG. 6 is similar to the configuration/operation of classifier 310, classification-to-decoders mapping table 311, decoders 312, and merger 315 of FIG. 3, respectively. However, rather than the decoders 612 being configured to store packets classified by the classifier 610, the decoders 612 are configured to split packets classified by the classifier 610 into chunks and to store the chunks (rather than the packets from which the chunks are generated) in the content stores 613 of the decoders 612. In one embodiment, for a packet in a given packet class, the first decoder 612 in the decoders list for the given packet class is responsible for splitting the packet into chunks. The chunks of the packets may be handled by the decoders 612 in any suitable manner.

In one embodiment (as depicted in FIG. 6), the chunk storing and processing responsibilities are split across the decoders 612 based on hash regions.

In one embodiment, each decoder 612$_1$-612$_N$ is assigned a hash region, respectively. In one embodiment, first decoder 612$_1$ is assigned a hash region [0.0-a], second decoder 612$_2$ is assigned a hash region [a-b], and so forth until next-to-last decoder 612$_{N-1}$ is assigned a hash region [(n−2)-(n−1)] and last decoder 612$_N$ is assigned a hash region [(n−1)-1.0]. It is noted that these hash regions are merely exemplary and that any suitable numbers of hash regions of any suitable size may be assigned to decoders 612. It is noted that, although primarily depicted and described with respect to embodiments in which each decoder 612 has only a single hash region assigned thereto, one or more decoders 612 may have multiple hash regions assigned thereto.

In one embodiment, the decoders 612 are configured such that (1) a decoder 612 stores a chunk if a hash computed for the chunk falls within the hash region assigned to the decoder 612 and (2) a decoder 612 only performs a lookup for a chunk if the chunk has an associated hash that falls within the hash region assigned to the decoder 612.

In one embodiment, mappings of the hash regions to the decoders 612 responsible for the hash regions are maintained in the hash region mapping tables 616$_1$-616$_N$ (i.e., each decoder 612 has information indicative of which hash regions map to which decoders 612). It is noted that, although primarily depicted and described with respect to embodiments in which mappings of the hash regions to the decoders 612 responsible for the hash regions are maintained using N hash region mapping tables 616$_1$-616$_N$ implemented on the decoders 612$_1$-612$_N$, respectively, the mappings of the hash regions to the decoders 612 responsible for the hash regions may be maintained using a single hash region mapping table that is accessible to each of the decoders 612 or using multiple hash region mapping tables accessible to respective subsets of the decoders 612.

The operation of RE decoding middlebox 600$_D$ may be better understood by considering the manner in which a packet is processed for RE decoding when received at RE decoding middlebox 600$_D$. The classifier 610 classifies the packet into an associated packet class. The classifier 610 provides the packet to a first decoder 612 in the decoders list specified for the packet class as determined by the classifier 610 from the classification-to-decoders mapping table 611. The first decoder 612 decodes the encoding keys included within the packet. The encoding keys are associated with chunks of packets stored the content stores 613 of one or more of the decoders 612. The encoding keys may be hashes of the chunks as computed by RE encoding middlebox 112$_E$. The first decoder 612 performs lookups to its content store 613 for each of the chunks having respective hashes falling within the hash region assigned to the first decoder 612. The first decoder 612 performs decoding of the packet by replacing (1) the encoding keys for each of the chunks having respective hashes falling within the hash region assigned to the first decoder 612 with (2) the chunks corresponding to the encoding keys for the each of the chunks having respective hashes falling within the hash region assigned to the first decoder 612. The first decoder 612 then selects the next decoder 612 to which the packet is to be provided. The first decoder 612 selects the next decoder 612 to which the packet is to be provided based on (1) the hashes for the remaining encoding keys of the packet (i.e., the hash or hashes identified by the first decoder 612, but falling outside of the hash region for which the first decoder 612 is responsible), (2) the mappings of the hash regions to the decoders 612 responsible for the hash regions (as specified in the hash region mapping table 616 of the first decoder 612), and (3) the decoders list for the packet class (as specified in the packet itself or available from the classification-to-decoders mapping table 611). For example, the first decoder 612 may (1) search its hash region mapping table 616, using the remaining hashes of the packet, in order to identify one or more other decoders 612 responsible for one or more of the remaining hashes of the packet (where the remaining hashes of the packet are those hashes that are computed by the first decoder 612 but which fall outside of the hash region for which the first decoder 612 is responsible) and (2) select the next decoder 612 from the one or more other decoders 612 based on the decoders list for the packet class. For example, the first decoder 612 may select the identified other decoder 612 that is next on the decoders list for the packet class. The next decoder 612 then (1) performs decoding of the packet for each chunk having a hash falling within the hash region assigned to the next decoder 612 and (2) determines the next element to which the packet is to be propagated (another decoder 612 or merger 615). The decoding of the packet continues in this manner until the packet is fully decoded. It is noted that use of the hash region mapping tables 616 may obviate the need for the packet to be passed through all of the decoders 612 (e.g., where some of the decoders 612 have associated hash regions that are not applicable to any of the chunks of the packet), thereby resulting in a reduction in bandwidth usage in order to decode the packet. It is noted that, although the foregoing description assumes that multiple decoders 612 will be used to decode a packet (for purposes of illustrating use of multiple decoders 612 to decode a packet), it is possible that a packet may be fully decoded by the first decoder 612 and passed directly from the first decoder 612 to the merger 615.

For example, consider the case of an RE decoding middlebox $600_D$ having three decoders $612_1$-$612_3$. In this example, the hash regions may be assigned to the decoders 612 as follows: decoder $612_1$ (hash region [0.0-0.3]), decoder 6122 (hash region [0.3-0.6]), and decoder 6123 (hash region [0.6-1.0]). In this example, decoder $612_1$ performs hash lookups and stores hashes only for chunks having hashes in the [0.0-0.3] hash region, decoder $612_2$ performs hash lookups and stores hashes only for chunks having hashes in the [0.3-0.6] hash region, and decoder $612_3$ performs hash lookups and stores hashes only for chunks having hashes in the [0.6-1.0] hash region. Thus, the RE operations can be balanced across the three decoders 612.

In this manner, the chunk lookups and the chunk stores may be distributed across the decoders 612 in any suitable manner (e.g., equally, nearly equally, or in any other suitable manner) by splitting the hash regions appropriately.

As described with respect to RE encoding middlebox $500_E$ of FIG. 5, RE decoding middlebox 600D of FIG. 6 may support additional management functions (e.g., dynamic monitoring and reconfiguration of hash regions, dynamic addition or removal of decoders 612 to/from RE decoding middlebox 600, or the like, as well as various combinations thereof).

In one embodiment (which is omitted for purposes of clarity), the chunk storing and processing responsibilities are split across the decoders 612 without using hash regions. In one embodiment, since hash regions are not used, each packet is required to traverse each of the decoders 612 in the decoders list for the packet class of the packet, such that the hashes of each of the chunks of the packet can be checked by the decoders 612 for RE decoding of the packet.

In one embodiment, RE encoding middlebox $112_E$ and RE decoding middlebox $112_D$ are configured to leverage Distributed Hash Tables (DHTs) for performing RE encoding and decoding functions, respectively. In general, a DHT is a distributed data structure that provides lookup and store functions similar to a hash table, where any participating node can efficiently retrieve the value associated with a key. Additionally, a DHT generally scales well to a large number of nodes and can handle node additions/removals relatively easily.

The DHT-based max-match RE approach is similar to the max-match RE approach that is depicted and described with respect to FIGS. 2 and 3, except that the fingerprint tables 213 of the encoders 212 are maintained as a DHT across the encoders 212 and, similarly, the fingerprint tables 313 of the decoders 312 are maintained as a DHT across the decoders 312. The configuration of RE encoding middlebox $112_E$ and RE decoding middlebox $112_D$ to leverage a DHT for max-match RE is depicted and described with respect to FIGS. 7 and 8, respectively.

Figure 7:
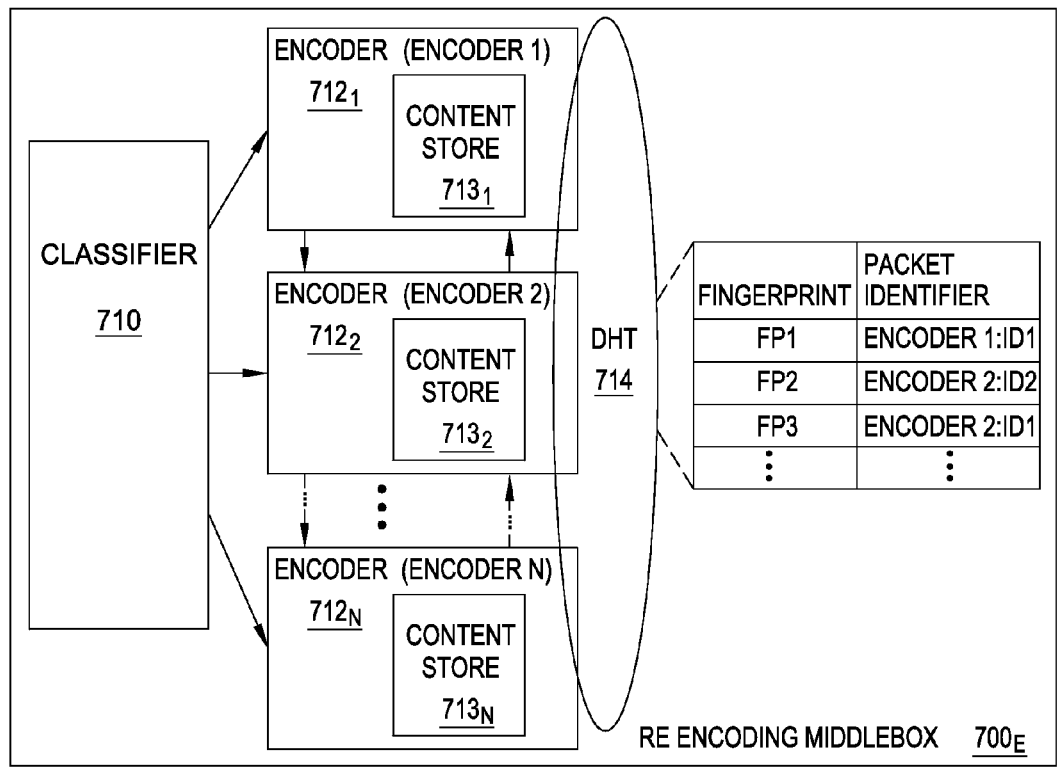
FIG. 7 depicts an exemplary embodiment of an RE encoding middlebox for DHT-based max-match RE.

FIG. 7 depicts an exemplary embodiment of an RE encoding middlebox for DHT-based max-match RE.

The RE encoding middlebox $700_E$ for DHT-based max-match RE is similar to the RE encoding middlebox $200_E$ for max-match RE.

The RE encoding middlebox $700_E$ includes a classifier 710, a plurality of encoders $712_1$-$712_N$ (collectively, encoders 712), and a DHT 714. The encoders $712_1$-$712_N$ include a plurality of content stores $713_1$-$713_N$ (collectively, content stores 713), respectively. The RE encoding middlebox $700_E$ also will include a merger (which has been omitted from FIG. 7 for purposes of clarity).

The classifier 710 is configured to communicate with each of the encoders 712. The encoders 712 are configured to communicate with each other and it is noted that, although primarily depicted as communicating with each other serially (illustratively, encoder $712_1$ communicating with encoder $712_2$, and so forth, as well as in the opposite order), in at least some embodiments any encoder 712 may communicate with any other encoder 712 directly (i.e., without traversing other encoders 712) or indirectly without traversing the depicted order of encoders 712.

The classifier 710 receives packets and determines classifications of the received packets. The classifier 710 assigns the responsibility of storing packets and computing fingerprints to encoders 712 based on the packet classes (e.g., encoder $712_1$ is responsible for storing packets and computing fingerprints for the FIRST CLASS, encoder $712_2$ is responsible for storing packets and computing fingerprints for the SECOND CLASS, and so forth, with encoder $712_N$ being responsible for storing packets and computing fingerprints for the N-th CLASS). The RE encoding middlebox $700_E$ may support any suitable numbers and types of packet classes which may be based on any suitable criteria. For example, classification of received packets by classifier 710 may be performed in a round-robin manner, using load-balancing based on packet sizes of the packets, or the like. In one embodiment, the set of packet classes supported by the RE encoding middlebox $700_E$ is the same as the set of packet classes supported by the RE decoding middlebox $112_D$. The classifier 710 provides classified packets to the encoders 712 in accordance with the assignment of responsibilities to the encoders 712 based on the packet classes.

The DHT 714 specifies mappings of fingerprints to packet pointers. In DHT 714, the packet pointer for a given fingerprint includes information which may be used by an encoder 712 to retrieve the packet. The packet pointer includes packet storage location information (i.e., identifying the encoder 712 in which the packet is stored) and packet identifier information (i.e., the packet identifier of the packet within the encoder 712 in which the packet is stored). This is illustrated in FIG. 7, where a first fingerprint (FP1) has associated therewith a first packet pointer denoted as Encoder1:ID1 (i.e., the packet associated with FP1 is a packet having packet identifier ID1 that is stored in encoder $712_1$), a second fingerprint (FP2) has associated therewith a second packet pointer denoted as Encoder1:ID2 (i.e., the packet associated with FP2 is a packet having packet identifier ID2 that is stored in encoder $712_1$), a third fingerprint (FP3) has associated therewith a third packet pointer denoted as Encoder2:ID1 (i.e., the packet associated with FP3 is a packet having packet identifier ID1 that is stored in encoder $712_2$), and so forth.

The classifier 710 receives a packet and provides the packet to one of the encoders 712 based on the packet class of the packet as determined by the classifier 710 (i.e., the primary encoder 712 assigned for that packet class). The primary encoder 712 to which the classifier 710 provides the packet is responsible for storing the packet and computing fingerprints for the packet. The primary encoder 712, for each of the computed fingerprints, performs a fingerprint lookup in DHT 714 in order to identify which encoder 712 is storing the packet for the computed fingerprint and to determine the packet identifier of the packet within the content store 713 of the encoder 712 that is storing the packet for the computed fingerprint. The primary encoder 712 performs RE encoding of the packet for any fingerprints identified as being associated with packets stored locally in the content store 713 of the primary encoder 712. The primary encoder 712 then propagates the packet such that it may be further processed by each of the other encoders 712 identified from the DHT 714 based on the fingerprints computed by the primary encoder 712.

In one embodiment, the packet is propagated to the other encoders 712 serially. In one embodiment, the primary encoder 712 includes within the packet the list of packet pointers determined by the primary encoder 712 from DHT 714, such that each encoder 712 that processes the packet can identify directly from the packet itself a next encoder 712 to which to provide the packet. The primary encoder 712 propagates the packet to a next encoder 712. The next encoder 712 receives the packet, parses the list of packet pointers included within the packet to identify each packet pointer that points to its content store 713, and uses the identified packet pointer(s) to encode the corresponding region(s) of the packet. The encoding of a region of the received packet based on a matching region of a stored packet using max-match RE will be understood at least from the description of FIG. 2. The next encoder 712 then identifies a next element to which the packet is to be provided (e.g., another encoder 712 as determined from list of packet pointers included within the packet, or a merger where the encoder 712 is the final encoder to process the packet for RE encoding of the packet). The encoding of the packet continues in this manner until the packet is fully encoded and provided to the merger.

It is noted that if, during expansion of a matching region of the packet for a first fingerprint, the matching region is determined to cover a region of the packet associated with a second fingerprint, the pointer for the second fingerprint may be ignored during encoding of the packet. In this case, where the fingerprint is associated with a packet maintained in the content store 713 of the encoder 712 that is currently processing the packet, the encoder 712 that is currently processing the packet can ignore that next fingerprint in the list of fingerprints computed for the received packet and embedded within the received packet. Similarly, in this case, where the fingerprint is associated with a packet maintained in the content store of a subsequent encoder 712 (i.e., one other than the encoder 712 that is currently processing the packet), the subsequent encoder 712 can ignore that fingerprint in the list of fingerprints computed for the received packet and embedded within the received packet. In one such embodiment, that fingerprint may be removed from the list of fingerprints that is included in the received packet, thereby preventing use of that fingerprint when RE encoding the receive packet.

It is noted that, although the foregoing description for serial encoding of the packet assumes that multiple encoders 712 will be used to encode the packet (for purposes of illustrating use of multiple encoders 712 to encode a packet), it is possible that the packet may be fully encoded by the primary encoder 712 and passed directly from the primary encoder 712 to the merger.

In one embodiment, the packet is propagated to the other encoders 712 in parallel. The other encoders 712 perform processing to determine encoding of the packet, but do not actually perform encoding of the packet. Rather, each of the other encoders 712 determines packet encoding information adapted for use in encoding the packet and provides the packet encoding information to the primary encoder 712. The primary encoder 712 receives the packet encoding information from the other encoders 712 and encodes the packet based on the packet encoding information from the other encoders 712 (e.g., performs packet encoding including replacement of matched regions with associated encoding keys for all of the fingerprints computed by primary encoder 712). The packet encoding information that is determined by one of the other encoders 712 includes, for each fingerprint for which the other encoder 712 stores the associated packet in its packet store 713, matched region encoding information for the matched region associated with the fingerprint. The matched region encoding information includes a length of the matched region for the fingerprint and the location within the packet at which the matched region is located (e.g., matched region offset information). The primary encoder 712 may then use the matched region length values and matched region offset values for each of the fingerprints of the received packet to perform RE encoding of the received packet. The primary encoder 712 then provides the encoded packet to the merger.

It is noted that, by providing the packet to the other encoders 712 in parallel and configuring the primary encoder 712 to perform that actual packet encoding for all of the matched regions of the packet, the primary encoder 712 has a view of all matched regions and may compare the matched regions in a manner for maximizing bandwidth savings (at the expense of increasing the processing overhead on each of the other encoders 712).

It is noted that, although primarily depicted and described with respect to embodiments in which the primary encoder 712 is the only encoder 712 that computes fingerprints for the packet, in at least one embodiment the computation of the fingerprints may be performed by multiple encoders 712 (or even each of the encoders 712). This may be used where the other encoders 712 process the packet serially or in parallel for RE encoding of the packet.

In such embodiments, different ones of the encoders 712 perform different sets of RE encoding functions for different packets based on the packet classes of the packets.

It is noted that the DHT-based max-match RE approach enables computation and storage to be spread out over the various encoders 712 based on the policy of the classifier 710 while the DHT 714 provides load balancing of fingerprint lookups and inserts. Here, no permutation of node order traversal is required for load balancing, because the DHT 714 provides load balancing.

Figure 8:
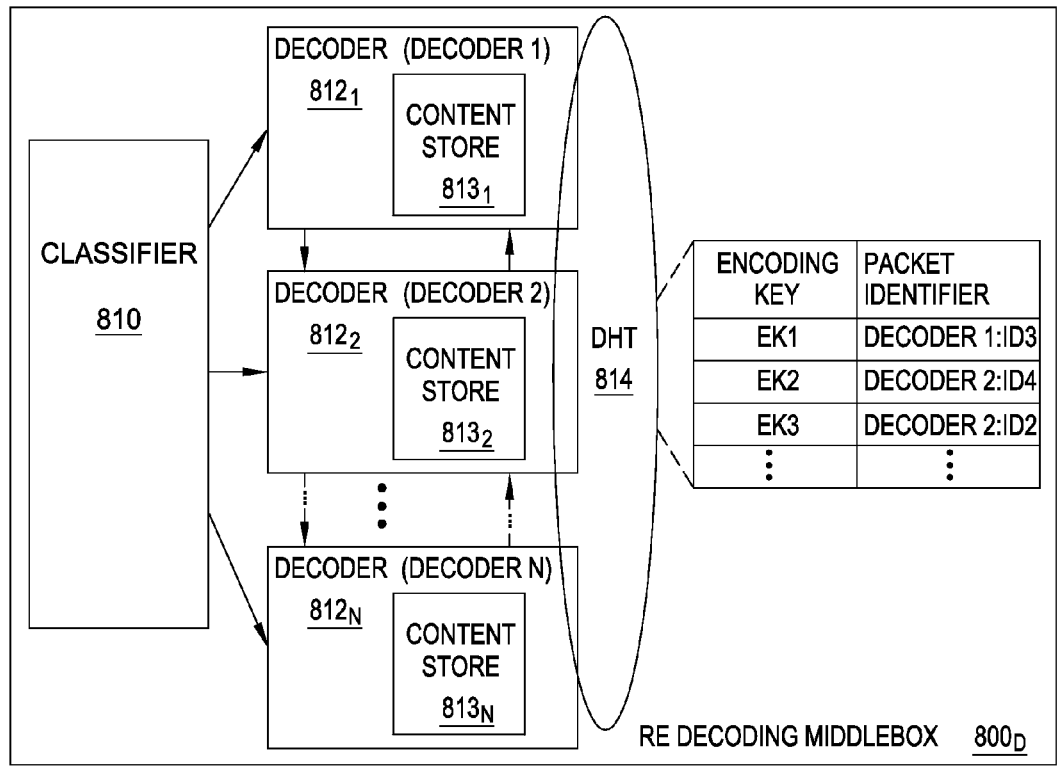
FIG. 8 depicts an exemplary embodiment of an RE decoding middlebox for DHT-based max-match RE.

FIG. 8 depicts an exemplary embodiment of an RE decoding middlebox for DHT-based max-match RE.

The RE decoding middlebox $800_D$ for DHT-based max-match RE is similar to the RE decoding middlebox $300_D$ for max-match RE.

The RE decoding middlebox $800_D$ of FIG. 8 is configured to operate in a manner similar to the RE encoding middlebox $700_E$ of FIG. 7, with the RE decoding middlebox $800_D$ performing RE decoding functions complementary to the RE encoding functions performed by RE encoding middlebox $700_E$.

The RE decoding middlebox $800_E$ includes a classifier 810, a plurality of decoders $812_1$-$812_N$ (collectively, decoders 812), and a DHT 814. The decoders $812_1$-$812_N$ include a plurality of content stores $813_1$-$813_N$ (collectively, content stores 813), respectively. The RE decoding middlebox $800_E$ also will include a merger (which has been omitted from FIG. 8 for purposes of clarity).

The classifier 810 is configured to communicate with each of the decoders 812. The decoders 812 are configured to communicate with each other and it is noted that, although primarily depicted as communicating with each other serially (illustratively, decoder $812_1$ communicating with decoder $812_2$, and so forth, as well as in the opposite order), in at least some embodiments any decoder 812 may communicate with any other decoder 812 directly (i.e., without traversing other decoders 812) or indirectly without traversing the depicted order of decoders 812.

The classifier 810 receives packets and determines classifications of the received packets. The classifier 810 assigns the responsibility of storing packets and performing encoding key lookups to decoders 812 based on the packet classes (e.g., decoder $812_1$ is responsible for storing packets and performing encoding key lookups for the FIRST CLASS, decoder $812_2$ is responsible for storing packets and performing encoding key lookups for the SECOND CLASS, and so forth, with decoder $812_N$ being responsible for storing packets and performing encoding key lookups for the N-th CLASS). The RE decoding middlebox $800_E$ may support any suitable numbers and types of packet classes which may be based on any suitable criteria. For example, classification of received packets by classifier 810 may be performed in a round-robin manner, using load-balancing based on packet sizes of the packets, or the like. In one embodiment, the set of packet classes supported by the RE decoding middlebox $800_D$ is the same as the set of packet classes supported by the RE encoding middlebox $112_E$. The classifier 810 provides classified packets to the decoders 812 in accordance with the assignment of responsibilities to the decoders 812 based on the packet classes.

The DHT 814 specifies mappings of encoding keys to packet pointers to stored packets. In DHT 814, the packet pointer for a given encoding key includes information which may be used by a decoder 812 to retrieve the packet for use in replacing the encoding key of the received packet with content from the stored packet. The packet pointer includes packet storage location information for the stored packet (i.e., identifying the decoder 812 in which the packet is stored) and packet identifier information (i.e., the packet identifier of the stored packet within the decoder 812 in which the packet is stored). This is illustrated in FIG. 8, where a first encoding key (EK1) has associated therewith a first packet pointer denoted as Decoder1:ID3 (i.e., the packet associated with EK1 is a packet having packet identifier ID3 that is stored in decoder $812_1$), a second encoding key (EK2) has associated therewith a second packet pointer denoted as Decoder1:ID4 (i.e., the packet associated with EK2 is a packet having packet identifier ID4 that is stored in decoder $812_1$), a third encoding key (EK3) has associated therewith a third packet pointer denoted as Decoder2:ID2 (i.e., the packet associated with EK3 is a packet having packet identifier ID2 that is stored in decoder $812_2$), and so forth.

The classifier 810 receives a packet and provides the packet to one of the decoders 812 based on the packet class of the packet as determined by the classifier 810 (i.e., the primary decoder 812 assigned for that packet class). The primary decoder 812 to which the classifier 810 provides the packet is responsible for performing encoding key lookups for the packet. The primary decoder 812, for each of the encoding keys of the received packet, performs an encoding key lookup in DHT 814 in order to identify which decoder 812 is storing the packet for the encoding key and to determine the packet identifier of the packet within the content store 813 of the decoder 812 that is storing the packet for the encoding key. The primary decoder 812 performs RE decoding of the packet for any encoding keys identified as being associated with packets stored locally in the content store 813 of the primary decoder 812. The primary decoder 812 then propagates the packet such that it may be further processed by each of the other decoders 812 identified from the DHT 814 based on the encoding keys identified by the primary decoder 812.

In one embodiment, the packet is propagated to the other decoders 812 serially. In one embodiment, the primary decoder 812 includes within the packet the list of packet pointers determined by the primary decoder 812 from DHT 814, such that each decoder 812 that processes the packet can identify directly from the packet itself a next decoder 812 to which to provide the packet. The primary decoder 812 propagates the packet to a next decoder 812. The next decoder 812 receives the packet, parses the list of packet pointers included within the packet to identify each packet pointer that points to its content store 813, and uses the identified packet pointer(s) to decode the corresponding region(s) of the packet. The decoding of a region of the received packet using max-match RE will be understood at least from the description of FIG. 3. The next decoder 812 then identifies a next element to which the packet is to be provided (e.g., another decoder 812 as determined from the list of packet pointers included within the packet, or a merger where the decoder 812 is the final decoder to process the packet for RE decoding of the packet). The decoding of the packet continues in this manner until the packet is fully decoded and provided to the merger. The final decoder 812 to perform RE decoding of the packet stores the decoded packet in its content store 813. It is noted that, although the foregoing description for serial decoding of the packet assumes that multiple decoders 812 will be used to decode the packet (for purposes of illustrating use of multiple decoders 812 to decode a packet), it is possible that the packet may be fully decoded by the primary decoder 812 and passed directly from the primary decoder 812 to the merger.

In one embodiment, the packet is propagated to the other decoders 812 in parallel. The other decoders 812 perform processing to determine decoding of the packet, but do not actually perform decoding of the packet (i.e., the decoders 812 do not replace the encoding keys with corresponding portions of packets indicated by the encoding keys). Rather, each of the other decoders 812 determines packet decoding information adapted for use in decoding the packet and provides the packet decoding information to the primary decoder 812. The primary decoder 812 receives the packet decoding information from the other decoders 812 and decodes the packet based on the packet decoding information from the other decoders 812 (e.g., performs packet decoding including replacement of encoding keys with associated matched regions of stored packets for all of the encoding keys identified by primary decoder 812). The packet decoding information that is determined by one of the other decoders 812 includes, for each encoding key for which the other decoder 812 stores the associated packet in its packet store 813, the content to be used to replace the encoding key in the packet. The primary decoder 812 may then use the content received for each of the fingerprints of the packet to perform RE decoding of the packet. The primary decoder 812 then provides the encoded packet to the merger. It is noted that, although primarily depicted and described with respect to embodiments in which the primary decoder 812 propagates the packet to the other decoders 812 in parallel and the other decoders 812 return packet decoding information to the primary decoder 812, in at least one embodiment the primary decoder 812 is configured to propagate information other than the packet itself to the other decoders 812 (e.g., the respective encoding key(s) to be processed by the other decoders 812 or the like) and the other decoders 812 return packet decoding information to the primary decoder 812.

It is noted that, although primarily depicted and described with respect to embodiments in which the primary decoder 812 is the only decoder 812 that identifies the encoding keys for the packet, in at least one embodiment the identification of the encoding keys may be performed by multiple decoders 812 (or even each of the decoders 812). This may be used where the other decoders 812 process the packet serially or in parallel for RE decoding of the packet.

In such embodiments, different ones of the decoders 812 perform different sets of RE decoding functions for different packets based on the packet classes of the packets.

It is noted that the DHT-based max-match RE approach enables computation and storage to be spread out over the various decoders 812 based on the policy of the classifier 810 while the DHT 814 provides load balancing of encoding key lookups. Here, no permutation of node order traversal is required for load balancing, because the DHT 814 provides load balancing. The DHT-based chunk-match RE approach is similar to the chunk-match RE approach that is depicted and described with respect to FIGS. 5 and 6, except that the fingerprint tables 513 and hash region mapping tables 516 of the encoders 512 are maintained as a DHT across the encoders 512 and, similarly, the fingerprint tables 613 and hash region mapping tables 616 of the decoders 612 are maintained as a DHT across the decoders 612. The configuration of RE decoding middlebox $112_E$ and RE decoding middlebox $112_D$ to leverage a DHT for chunk-match RE is depicted and described with respect to FIGS. 9 and 10, respectively.

Figure 9:
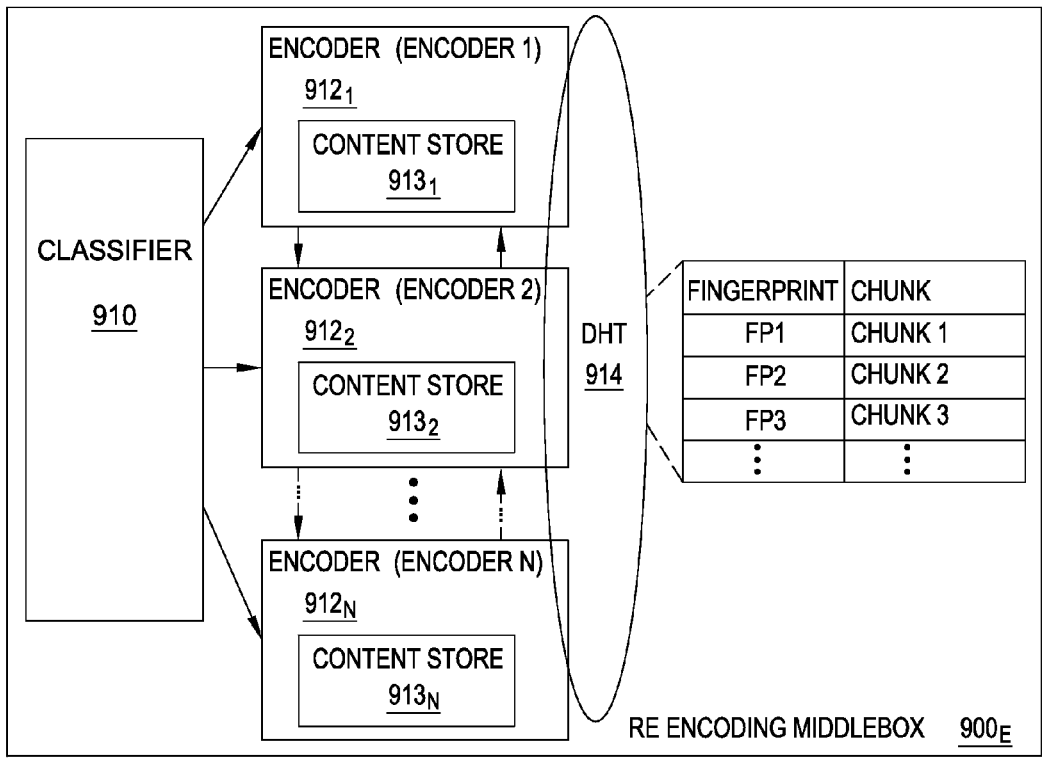
FIG. 9 depicts an exemplary embodiment of an RE encoding middlebox for DHT-based chunk-match RE.

FIG. 9 depicts an exemplary embodiment of an RE encoding middlebox for DHT-based chunk-match RE.

The RE encoding middlebox $900_E$ for DHT-based chunk-match RE is similar to the RE encoding middlebox $500_E$ for chunk-match RE.

The RE encoding middlebox $900_E$ includes a classifier 910, a plurality of encoders $912_1$-$912_N$ (collectively, encoders 912), and a DHT 914. The RE encoding middlebox $900_E$ also will include a merger (which has been omitted from FIG. 9 for purposes of clarity).

The classifier 910 is configured to communicate with each of the encoders 912. The encoders 912 are configured to communicate with each other and it is noted that, although primarily depicted as communicating with each other serially (illustratively, encoder $912_1$ communicating with encoder $912_2$, and so forth, as well as in the opposite order), in at least some embodiments any encoder 912 may communicate with any other encoder 912 directly (i.e., without traversing other encoders 912) or indirectly without traversing the depicted order of encoders 912.

The classifier 910 receives packets and determines classifications of the received packets. The classifier 910 assigns the responsibility of chunk computation to encoders 912 based on the packet classes (e.g., encoder $912_1$ is responsible for chunk computation for the FIRST CLASS, encoder $912_2$ is responsible for chunk computation for the SECOND CLASS, and so forth, with encoder $912_N$ being responsible for chunk computation for the N-th CLASS). The RE encoding middlebox $900_E$ may support any suitable numbers and types of packet classes which may be based on any suitable criteria. For example, classification of received packets by classifier 910 may be performed in a round-robin manner, using load-balancing based on packet sizes of the packets, or the like. In one embodiment, the set of packet classes supported by the RE encoding middlebox $900_E$ is the same as the set of packet classes supported by the RE encoding middlebox $112_E$. The classifier 910 provides classified packets to the encoders 912 in accordance with the assignment of responsibilities to the encoders 912 based on the packet classes.

The DHT 914 specifies mappings of fingerprints to chunks. In DHT 914, the fingerprint of a chunk is a hash of the chunk, which is then mapped to the chunk. In other words, the chunks themselves are maintained in the DHT 914. This is illustrated in FIG. 9, where a first fingerprint (FP1) for chunk 1 (which is a hash of chunk 1) is mapped to chunk 1, a second fingerprint (FP2) for chunk 2 (which is a hash of chunk 2) is mapped to chunk 2, a third fingerprint (FP3) for chunk 3 (which is a hash of chunk 3) is mapped to chunk 3, and so forth.

The classifier 910 receives a packet and provides the packet to one of the encoders 912 based on the packet class of the packet as determined by the classifier 910. The encoder 912 computes chunks for the packet. The encoder 912 computes fingerprints for the chunks of the packet. The encoder 912 performs fingerprint lookups and insertions, using DHT 914, for the chunks of the packets. The encoder 912 performs RE encoding of the packet based on the fingerprint lookups for the chunks of the packet. The encoder 912 provides the encoded packet to the merger.

In such embodiments, different ones of the encoders 912 perform RE encoding functions for different packets based on the packet classes of the packets.

It is noted that the DHT-based chunk-match RE approach enables computation and storage to be spread out over the various encoders 912 based on the policy of the classifier 910 while the DHT 914 (which provides a larger hash table) provides load balancing of fingerprint lookups and insertions.

Figure 10:
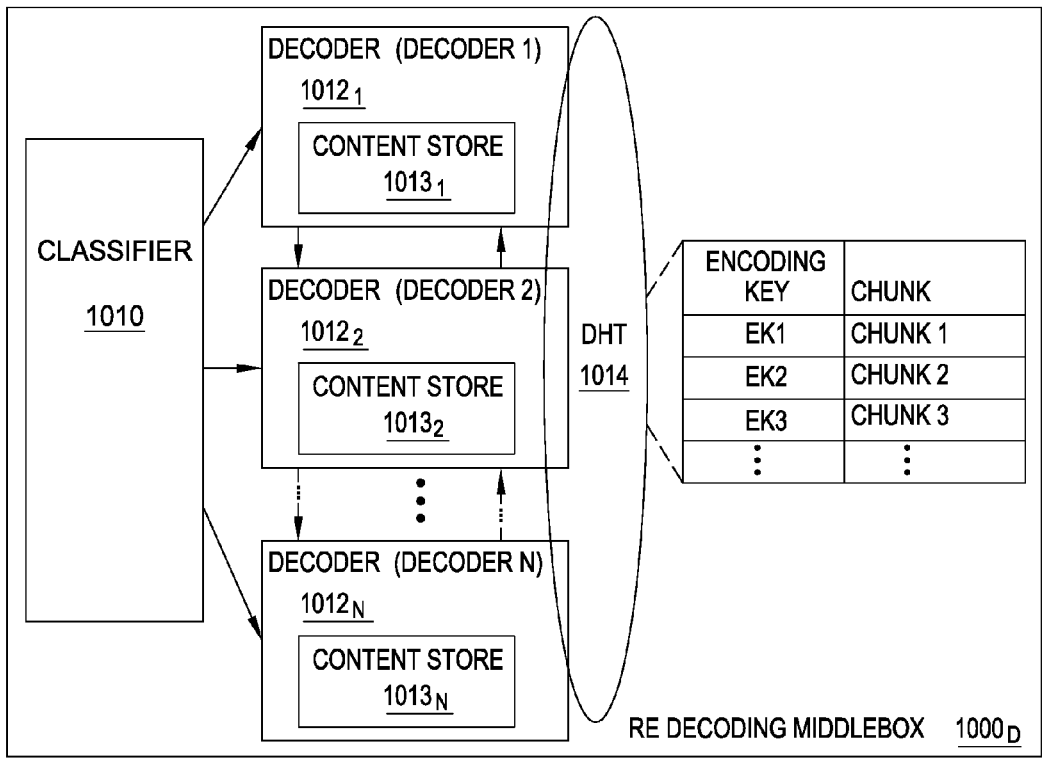
FIG. 10 depicts an exemplary embodiment of an RE decoding middlebox for DHT-based chunk-match RE.

FIG. 10 depicts an exemplary embodiment of an RE decoding middlebox for DHT-based chunk-match RE.

The RE decoding middlebox $1000_D$ for DHT-based chunk-match RE is similar to the RE decoding middlebox $600_D$ for chunk-match RE.

The RE decoding middlebox $1000_D$ of FIG. 10 is configured to operate in a manner similar to the RE encoding middlebox $900_E$ of FIG. 9, with the RE decoding middlebox $1000_D$ performing RE decoding functions complementary to the RE encoding functions performed by RE encoding middlebox $900_E$.

The RE decoding middlebox $1000_D$ includes a classifier 1010, a plurality of decoders $1012_1$-$1012_N$ (collectively, decoders 1012), and a DHT 1014. The RE decoding middlebox $1000_D$ also will include a merger (which has been omitted from FIG. 10 for purposes of clarity).

The classifier 1010 is configured to communicate with each of the decoders 1012. The decoders 1012 are configured to communicate with each other and it is noted that, although primarily depicted as communicating with each other serially (illustratively, decoder $1012_1$ communicating with decoder $1012_2$, and so forth, as well as in the opposite order), in at least some embodiments any decoder 1012 may communicate with any other decoder 1012 directly (i.e., without traversing other decoders 1012) or indirectly without traversing the depicted order of decoders 1012.

The classifier 1010 receives packets and determines classifications of the received packets. The classifier 1010 assigns the responsibility of chunk computation to decoders 1012 based on the packet classes (e.g., decoder $1012_1$ is responsible for chunk computation for the FIRST CLASS, decoder $1012_2$ is responsible for chunk computation for the SECOND CLASS, and so forth, with decoder $1012_N$ being responsible for chunk computation for the N-th CLASS). The RE decoding middlebox $1000_D$ may support any suitable numbers and types of packet classes which may be based on any suitable criteria. For example, classification of received packets by classifier 1010 may be performed in a round-robin manner, using load-balancing based on packet sizes of the packets, or the like. In one embodiment, the set of packet classes supported by the RE decoding middlebox $1000_D$ is the same as the set of packet classes supported by the RE encoding middlebox $112_E$. The classifier 1010 provides classified packets to the decoders 1012 in accordance with the assignment of responsibilities to the decoders 1012 based on the packet classes.

The DHT 1014 specifies mappings of encoding keys to chunks. In DHT 1014, the encoding key of a chunk is a hash of the chunk, which is then mapped to the chunk. In one embodiment, the chunks themselves are maintained in the DHT 1014. This is illustrated in FIG. 10, where a first encoding key (EK1) for chunk 1 (which is a hash of chunk 1) is mapped to chunk 1, a second encoding key (EK2) for chunk 2 (which is a hash of chunk 2) is mapped to chunk 2, a third encoding key (EK3) for chunk 3 (which is a hash of chunk 3) is mapped to chunk 3, and so forth.

The classifier 1010 receives a packet and provides the packet to one of the decoders 1012 based on the packet class of the packet as determined by the classifier 1010. For encoded regions of the packet, the decoder 1012 decodes the packet by identifying the encoding keys in the encoded packet, using the encoding keys to retrieve the chunks from the DHT 1014, and replacing the encoding keys with the chunks retrieved from the DHT 1014. For un-encoded regions of the packet, the decoder 1012 computes hashes of the chunks of the un-encoded regions of the packet and inserts the chunks into the DHT 1014 (e.g., for each chunk, inserting a record including a hash of the chunk as the encoding key and the chunk itself mapped to the encoding key). The decoder 1012 provides the decoded packet to the merger.

In such embodiments, different ones of the decoders 1012 perform RE decoding functions for different packets based on the packet classes of the packets.

It is noted that the DHT-based chunk-match RE approach enables computation and storage to be spread out over the various decoders 1012 based on the policy of the classifier 1010 while the DHT 1014 (which provides a larger hash table) provides load balancing of encoding key lookups and insertions.

It is noted that, although primarily depicted and described with respect to embodiments in which the chunks themselves are stored in the DHT 1014, it at least one embodiment the DHT 1014 may store mappings of encoding keys to the storage locations of the associated chunks (e.g., specified in terms of an identifier of the decoder 1012 storing the chunk and the identifier of the chunk within the decoder 812 storing the chunk).

Returning now to FIG. 1, it may be seen, from FIG. 2-FIG. 10, that RE encoding middlebox $112_E$ includes various elements (e.g., a classifier, encoders, and a merger and, in some cases, other elements) and, similarly, that RE decoding middlebox $112_D$ includes various elements (e.g., a classifier, decoders, and a merger and, in some cases, other elements). The RE encoding middlebox $112_E$ and RE decoding middlebox $112_D$ may be referred to collectively as RE processing middleboxes 112 (and, thus, the encoders of RE encoding middlebox $112_E$ and the decoders of RE decoding middlebox $112_D$ may be referred to collectively as RE data processors or RE data processing modules). The elements of an RE processing middlebox 112 may be implemented within a cloud site 110 in any suitable manner. For example, the classifier, each of the RE data processors, and the merger of an RE processing middlebox 112 may be implemented using virtual machines (VMs). For example, the classifier, each of the RE data processors, and the merger may be implemented using respective VMs, using a set of VMs where one or more of the VMs are configured to provide multiple elements (e.g., multiple RE data processors), or the like. For example, the VMs may be implemented on the same Central Processing Unit (CPU) of a blade server, on multiple CPUs of the same blade server, on multiple CPUs spread across multiple blade servers of the same switch, on multiple CPUs spread across multiple blade servers of multiple switches, or the like, as well as various combinations thereof. Thus, communication between such elements may be supported in any manner suitable for use within a cloud environment (e.g., internal communication within a CPU when multiple elements are implemented on the same CPU, internal communication within a blade server but across CPUs when the elements are implemented across different CPUs of the same blade server, communications between blade servers of the same switch when the elements are implemented across CPUs of different blade servers, communications between switches of the cloud site when the elements are implemented across CPUs of different switches, or the like, as well as various combinations thereof).

It is noted that, although primarily depicted and described herein with respect to embodiments in which the various data structures used by the RE data processing modules are stored within the RE data processing modules, in at least some embodiments one or more of the data structures of one or more of the RE data processing modules may be stored outside of the one or more RE data processing modules. For example, such data structures may include content stores, fingerprint tables, hash region mapping tables, or the like. Accordingly, depiction and description herein indicating that the various data structures used by the RE data processing modules are stored within the RE data processing modules also may represent embodiments in which the information of the data structures of the RE data processing modules is accessible to the associated RE data processing modules (e.g., internally or through any suitable mechanism for retrieving such information from memory, disk, or any other suitable storage module).

Figure 11:
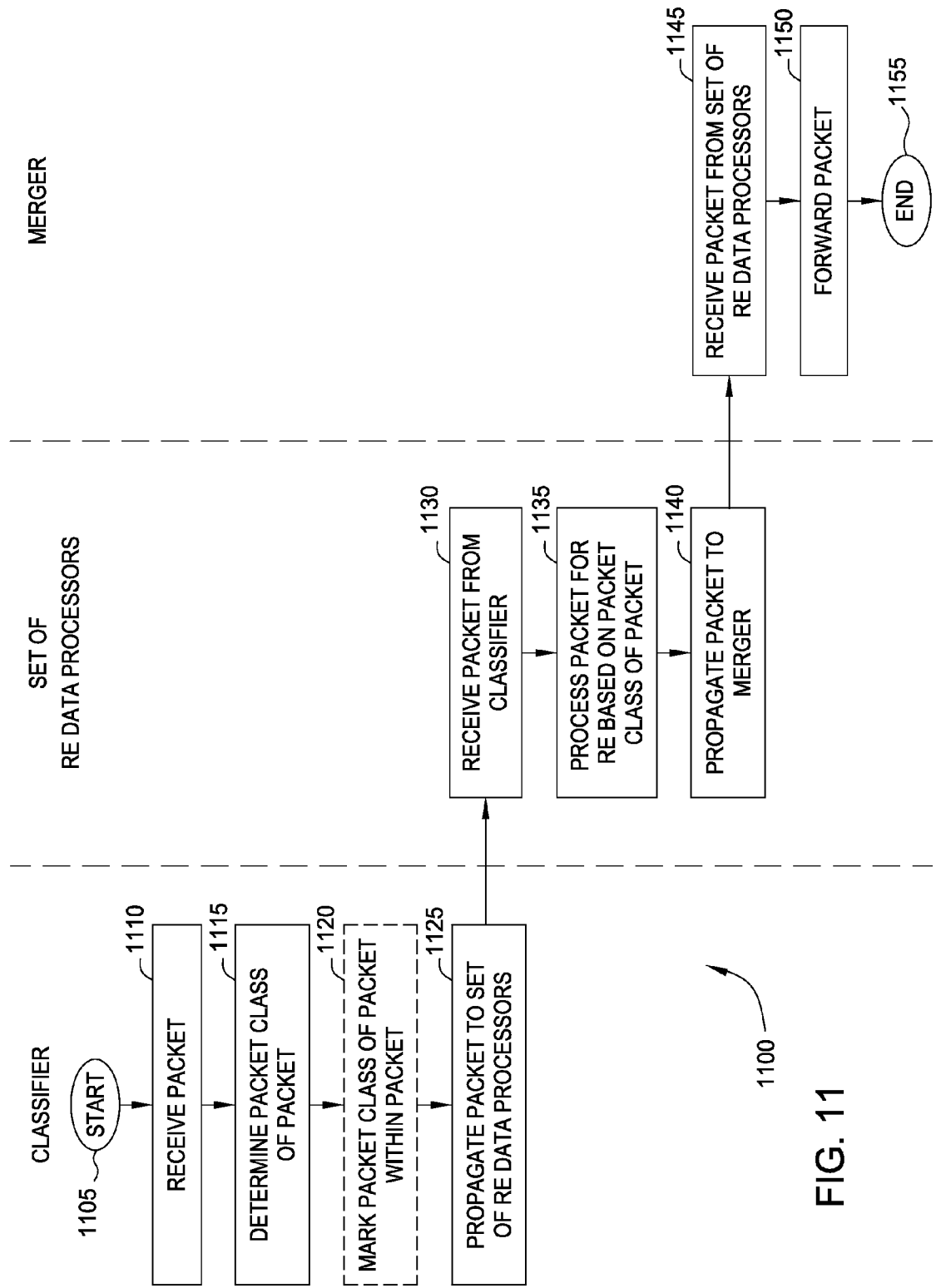
FIG. 11 depicts one embodiment of a method for processing a packet for supporting RE.

FIG. 11 depicts one embodiment of a method for processing a packet for supporting RE.

The method 1100 includes steps performed by a classifier, a set of RE data processors (which may include use of one or more RE data processors), and a merger.

It will be appreciated that method 1100 represents a general method for implementing the various functions depicted and described with respect to any of FIGS. 2-10.

It is noted that, although primarily depicted and described herein as being performed serially, steps of method 1100 may be performed contemporaneously or in a different order than depicted in FIG. 11.

At step 1105, method 1100 begins.

At step 1110, the classifier receives the packet. The packet is received at an RE encoding middlebox or an RE decoding middlebox. In the case of an RE encoding middlebox, the classifier receives the packet from an appropriate source (e.g., another network, a network element, a user device, or the like). In the case of an RE decoding middlebox, the classifier receives the packet from the RE encoding middlebox via a network.

At step 1115, the classifier determines a packet class of the packet.

At step 1120 (an optional step which may not be performed in some embodiments), the classifier marks the packet class of packet in the packet. This may include marking the packet with an ordering of RE data processors to be used to process the packet.

At step 1125, the classifier propagates the packet to the set of RE data processors. It is noted that this may include providing the packet to one of the RE data processors, providing multiple portions of the packet to ones of the RE data processors, providing multiple copies of the packet to ones of the RE data processors, or the like, as well as various combinations thereof.

At step 1130, the set of RE data processors receives the packet. It is noted that this may include receipt of the packet by one of the RE data processors, receipt of multiple portions of the packet by ones of the RE data processors, receipt of multiple copies of the packet by ones of the RE data processors, or the like, as well as various combinations thereof.

At step 1135, the set of RE data processors processes the packet for RE based on the packet class of the packet. It is noted that this step may be performed by one or more of the RE data processors. It is further noted that the RE data processors may exchange the packet or portions of the packet.

At step 1140, the set of RE data processors propagates the packet to the merger.

At step 1145, the merger receives the packet from the set of RE data processors.

At step 1150, the merger forwards the packet. In the case of an RE encoding middlebox, the merger forwards the packet via a network toward an RE decoding middlebox. In the case of an RE decoding middlebox, the merger forwards the packet toward an appropriate destination (e.g., another network, a network element, a user device, or the like).

At step 1155, method 1100 ends.

As noted above, method 1100 generally represents a method for implementing the various functions depicted and described with respect to any of FIGS. 2-10. Thus, any function or combination of functions depicted and described with respect to any of FIGS. 2-10 may be implemented using any suitable number(s) or type(s) of processes. In such embodiments, a process for providing one or more functions depicted and described with respect to any of FIGS. 2-10 may be implemented using a processor and a memory, where the memory stores instructions which, when executed by the processor, cause the processor to perform the functions.

Figure 12:
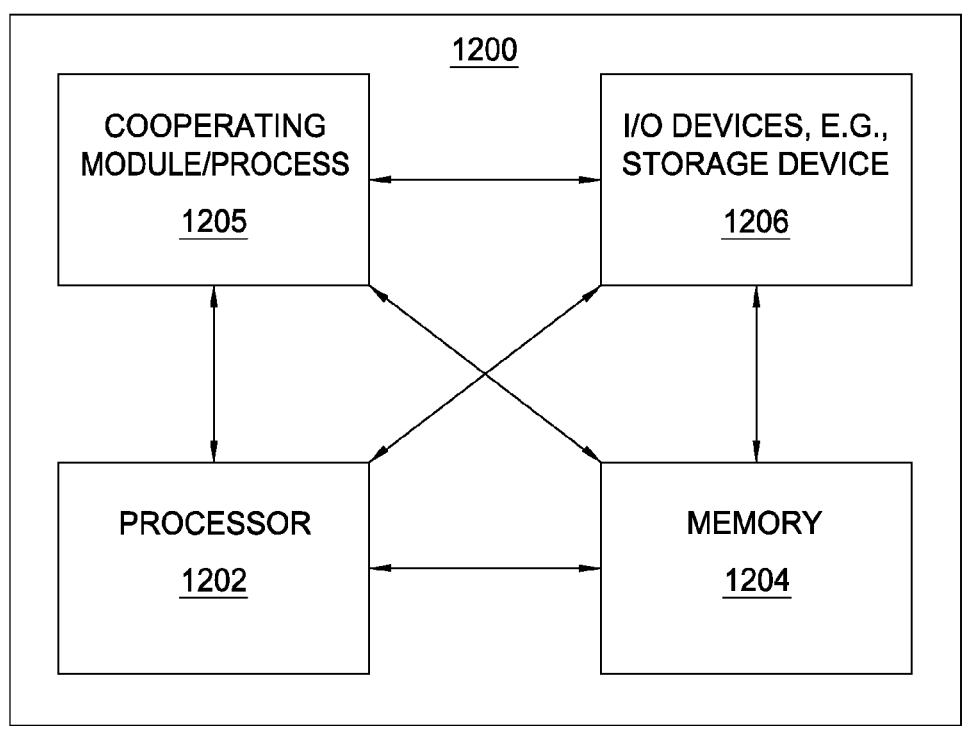
FIG. 12 depicts a high-level block diagram of a computer suitable for use in performing functions described herein.

FIG. 12 depicts a high-level block diagram of a computer suitable for use in performing functions described herein.

The computer 1200 includes a processor 1202 (e.g., a central processing unit (CPU) or other suitable processor(s)) and a memory 1204 (e.g., random access memory (RAM), read only memory (ROM), and the like).

The computer 1200 also may include a cooperating module/process 1205. The cooperating process 1205 can be loaded into memory 1204 and executed by the processor 1202 to implement functions as discussed herein and, thus, cooperating process 1205 (including associated data structures) can be stored on a computer readable storage medium, e.g., RAM memory, magnetic or optical drive or diskette, and the like.

The computer 1200 also may include one or more input/output devices 1206 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1200 depicted in FIG. 12 provides a general architecture and functionality suitable for implementing functional elements described herein or portions of functional elements described herein. For example, the computer 1200 provides a general architecture and functionality suitable for implementing one or more of RE encoding middlebox $112_E$, a portion of RE encoding middlebox $112_E$, RE decoding middlebox $112_D$, a portion of RE decoding middlebox $112_D$, a classifier of any of FIGS. 2-10, an encoder or decoder of any of FIGS. 2-10, a merger of any of FIGS. 2-10, or the like, as well as various combinations thereof.

It will be appreciated that the functions depicted and described herein may be implemented in software (e.g., via implementation of software on one or more processors, for executing on a general purpose computer (e.g., via execution by one or more processors) so as to implement a special purpose computer, and the like) or may be implemented in hardware (e.g., using a general purpose computer, one or more application specific integrated circuits (ASIC), or any other hardware equivalents).

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

Additionally, the term "or" as used herein refers to a non-exclusive "or," unless otherwise indicated (e.g., "or else" or "or in the alternative").

Although various embodiments which incorporate the teachings of the present invention have been shown and described in detail herein, those skilled in the art can readily devise many other varied embodiments that still incorporate these teachings.

What is claimed is:

1. An apparatus, comprising:
 a data processing module comprising a processor and a memory communicatively connected to the processor, wherein the data processing module is configured to support a set of redundancy elimination (RE) processing functions, wherein the data processing module is configured to:
  perform, for a first packet associated with a first packet class, a first set of RE processing functions including one or more of the RE processing functions; and
  perform, for a second packet associated with a second packet class different than the first packet class, a second set of RE processing functions including one or more of the RE processing functions;
  wherein the first set of RE processing functions and the second set of RE processing functions are different.

2. The apparatus of claim 1, wherein the data processing module comprises an RE encoding module or an RE decoding module.

3. The apparatus of claim 1, wherein the data processing module is one of a plurality of data processing modules, wherein the processor is configured to:

determine an ordered list of the plurality of data processing modules associated with the first packet class of the first packet; and determine the first set of RE processing functions based on a position of the data processing module within the ordered list of the plurality of data processing modules.

4. The apparatus of claim 3, wherein the processor is configured to determine the ordered list of the plurality of data processing modules associated with the first packet class of the first packet based on information included within the first packet.

5. The apparatus of claim 3, wherein the data processing module is configured to:
based on a determination that the data processing module is at a first position in the ordered list of the plurality of data processing modules:
store the first packet in a content store associated with the data processing module; and
perform RE encoding functions for the first packet using the content store associated with the data processing module and a fingerprint table associated with the data processing module.

6. The apparatus of claim 3, wherein the data processing module is configured to:
based on a determination that the data processing module is at a position other than a first position in the ordered list of the plurality of data processing modules:
perform RE encoding functions for the first packet, using a content store associated with the data processing module and a fingerprint table associated with the data processing module, without storing the first packet in the content store associated with the data processing module.

7. The apparatus of claim 3, wherein the data processing module is configured to:
based on a determination that the data processing module is at a position other than a last position in the ordered list of the plurality of data processing modules:
perform RE decoding functions for the first packet, using a content store associated with the data processing module, without storing the first packet in the content store.

8. The apparatus of claim 3, wherein the data processing module is configured to:
based on a determination that the data processing module is at a last position in the ordered list of the plurality of data processing modules:
perform RE decoding functions for the first packet using a content store associated with the data processing module; and
store the first packet in the content store associated with the data processing module.

9. The apparatus of claim 3, wherein the data processing module is configured to:
based on a determination that the data processing module is at a first position in the ordered list of the plurality of data processing modules:
split the first packet into a plurality of chunks; and
perform RE encoding functions for at least a portion of the chunks using a content store associated with the data processing module and a fingerprint table associated with the data processing module.

10. The apparatus of claim 9, wherein the plurality of data processing modules have a respective plurality of hash regions associated therewith, wherein the data processing module is configured to:

based on a determination that a hash of one of the chunks falls within the hash region of the data processing module, perform RE encoding functions for the one of the chunks using the content store associated with the data processing module and the fingerprint table associated with the data processing module.

11. The apparatus of claim 9, wherein the data processing module is a first data processing module, wherein the plurality of data processing modules have a respective plurality of hash regions associated therewith, wherein the first data processing module is configured to:
based on a determination that a hash of one of the chunks falls outside of the hash region of the first data processing module, propagate the first packet from the first data processing module toward a second data processing module of the plurality of data processing modules based on the hash region of the second data processing module and the hash of the one of the chunks.

12. The apparatus of claim 11, wherein the first data processing module is configured to:
select the second data processing module based on a determination that the hash of the one of the chunks falls within the hash region of the second data processing module.

13. The apparatus of claim 9, wherein the data processing module is a first data processing module, wherein the plurality of data processing modules have a respective plurality of hash regions associated therewith, wherein the first data processing module is configured to:
for one of the chunks having a hash falling outside of the hash region of the first data processing module, identify one of the data processing modules having an associated hash region covering the hash of the one of the chunks; and
select one of the identified data processing modules based on the ordered list of the plurality of data processing modules.

14. The apparatus of claim 3, wherein the data processing module is a first data processing module, wherein the first data processing module is configured to:
based on a determination that the first data processing module is at a position other than a first position in the ordered list of the plurality of data processing modules:
receive the first packet and at least one chunk of the first packet from a second data processing module of the plurality of data processing modules; and
perform RE encoding functions for at least one chunk of the first packet using a content store associated with the first data processing module and a fingerprint table associated with the first data processing module.

15. The apparatus of claim 3, wherein the data processing module is configured to:
based on a determination that the data processing module is at a first position in the ordered list of the plurality of data processing modules:
decode each encoding key included within the first packet.

16. The apparatus of claim 3, wherein the data processing module is configured to:
perform RE decoding functions for at least one encoding key of the first packet using a content store associated with the data processing module.

17. The apparatus of claim 3, wherein the plurality of data processing modules have a respective plurality of hash regions associated therewith, wherein the data processing module is configured to:

for an encoding key of the first packet, determine a hash of a chunk associated with the encoding key; and based on a determination that the hash of the chunk associated with the encoding key falls within the hash region of the data processing module, perform RE decoding functions for the chunk using the content store associated with the data processing module.

18. The apparatus of claim 3, wherein the data processing module is a first data processing module, wherein the first data processing module is configured to:

for an encoding key of the first packet, determine a hash of a chunk associated with the encoding key; and based on a determination that the hash of the chunk associated with the encoding key falls outside of the hash region of the first data processing module, propagate the first packet from the first data processing module toward a second data processing module of the plurality of data processing modules based on the hash region of the second data processing module and the hash of the chunk associated with the encoding key.

19. The apparatus of claim 18, wherein the first data processing module is configured to:

select the second data processing module based on a determination that the hash of the chunk falls within the hash region of the second data processing module.

20. The apparatus of claim 3, wherein the data processing module is a first data processing module, wherein the plurality of data processing modules have a respective plurality of hash regions associated therewith, wherein the first data processing module is configured to:

for a chunk having a respective hash falling outside of the hash region of the first data processing module, identify one of the data processing modules having a hash region covering the hash of the chunk; and select one of the identified data processing modules based on the ordered list of the plurality of data processing modules.

21. A method, comprising:

at a data processing module comprising a processor and a memory and configured to support a set of redundancy elimination (RE) processing functions:

performing, for a first packet associated with a first packet class, a first set of RE processing functions including one or more of the RE processing functions; and performing, for a second packet associated with a second packet class different than the first packet class, a second set of RE processing functions including one or more of the RE processing functions;

wherein the first set of RE processing functions and the second set of RE processing functions are different.

\* \* \* \* \*